United States Patent
Chen

(10) Patent No.: US 8,747,524 B2
(45) Date of Patent: Jun. 10, 2014

(54) METHOD AND EQUIPMENT FOR SEPARATING OUT MOLTEN DUST IN HIGH TEMPERATURE GAS AND USE THEREOF

(76) Inventor: Zhi-wei Chen, Pingxiang (CN)

(*) Notice: Subject to any disclaimer, the term of this patent is extended or adjusted under 35 U.S.C. 154(b) by 0 days.

(21) Appl. No.: 13/695,895

(22) PCT Filed: May 3, 2011

(86) PCT No.: PCT/CN2011/073596
§ 371 (c)(1),
(2), (4) Date: Nov. 2, 2012

(87) PCT Pub. No.: WO2011/137737
PCT Pub. Date: Nov. 10, 2011

(65) Prior Publication Data
US 2013/0047853 A1  Feb. 28, 2013

(30) Foreign Application Priority Data
May 4, 2010 (CN) .......................... 2010 1 0180861

(51) Int. Cl.
*B01D 45/00* (2006.01)
(52) U.S. Cl.
USPC ............. 95/268; 55/434.2; 55/434.4; 55/456; 55/346; 55/482; 95/269; 95/288; 95/274
(58) Field of Classification Search
CPC ............. C04B 41/009; C04B 38/0006; B01D 46/2411; B01D 45/16; B01D 45/12
USPC ........ 55/434.2, 434.4, 456, 346, 482; 95/268, 95/269, 288, 274
See application file for complete search history.

(56) References Cited

U.S. PATENT DOCUMENTS

| | | | | |
|---|---|---|---|---|
| 4,961,761 A | * | 10/1990 | Johnson | 55/434.4 |
| 2008/0229653 A1 | * | 9/2008 | Iversen et al. | 44/307 |
| 2008/0275278 A1 | * | 11/2008 | Clark | 585/240 |
| 2009/0314161 A1 | * | 12/2009 | Al-Alusi et al. | 95/271 |

FOREIGN PATENT DOCUMENTS

| | | |
|---|---|---|
| CN | 1986108131 A | 8/1987 |
| CN | 1935950 A | 3/2007 |
| CN | 2878935 | 3/2007 |
| CN | 101066517 A | 11/2007 |
| CN | 101201167 A | 6/2008 |
| CN | 201164766 Y | 12/2008 |
| CN | 101338231 | 1/2009 |

OTHER PUBLICATIONS

International Searching Authority, International Search Report mailed Aug. 11, 2011, of corresponding International Application No. PCT/CN2011/073596, filed May 3, 2011, 6 pages.

* cited by examiner

*Primary Examiner* — In Suk Bullock
*Assistant Examiner* — Dung H Bui
(74) *Attorney, Agent, or Firm* — Alston & Bird LLP

(57) ABSTRACT

A method for separating out molten dust in high temperature gas includes the steps of: passing the high temperature gas carrying molten dust through an adhesive separator, the molten dust adhering to the adhesive separator and separating from the high temperature gas, the molten dust adhering to the inner sidewall flowing downwardly due to the gravity force and discharging; conveying the cleaned high temperature gas into a heat exchanger directly or after heating materials for cooling and discharging; using the heat recycled by the heat exchanger to heat the gas supplied to the adhesive separator; and supplying the gas heated by the heat exchanger into the adhesive separator directly or after further reaction, the heat absorbed from the heat exchanger and the heat generated in the reaction keeping the temperature of the gas flowing out of the adhesive separator higher than the melting point of the dust.

10 Claims, 9 Drawing Sheets

Fig. 1

METHOD AND EQUIPMENT FOR SEPARATING OUT MOLTEN DUST IN HIGH TEMPERATURE GAS AND USE THEREOF

FIELD OF THE INVENTION

The present invention generally relates to methods for separating out molten dust in high temperature gas and, more particularly, relates to a method and equipment for separating out molten metal or mineral dust in high temperature gas and recycling the heat of the gas, as well as the use thereof in solid fuel combustion, solid fuel gasification, solid fuel smelting and metallurgical chemistry reaction.

BACKGROUND OF THE INVENTION

In the field of solid fuel combustion, especially in the field of coal combustion, dust in the coal is difficult to be cleaned, which may limit the application of coal. In some furnaces which have strict requirements to the cleanness of the fuel, only expensive liquid fuel or gas fuel can be used.

Chinese patent application number CN 200620012646.2, titled "Clean burner using coal instead of oil", discloses a method for use in clean combustion of coal and liquid dislagging. In the method for separating out molten dust in high temperature gas as disclosed, the air driven by an air damper sprays into the cylindrical chamber of the furnace along a direction tangent to the cylindrical furnace chamber and generates a centrifugal rotary force, so that the molten dust is separated from the high temperature gas and adheres to a sidewall around the furnace chamber before the molten dust is drained out. Although most of the coal dust can be separated out from the high temperature gas, the method disclosed in CN 200620012646.2 still cannot desirably separate the coal dust in the high temperature due to the following reasons.

(1) The air flow introduced into the furnace chamber must be corresponding to the fuel quantity added into the furnace chamber. Therefore, the number of air dampers disposed on the sidewall around the cylindrical furnace chamber is limited.

(2) The air flowing into the furnace chamber must be quickly mixed with the coal powder added into the furnace chamber for complete combustion. Therefore, the air dampers must be arranged adjacent to the location where the coal powder is added into the furnace chamber. The air dampers cannot be disposed freely along the length direction of the cylindrical furnace chamber.

(3) When the cylindrical furnace chamber is required to extend to improve the separation efficiency of the molten dust, the air damper cannot be disposed freely along the length direction of the cylindrical furnace chamber. Therefore, in the extended portion of the cylindrical furnace chamber, rotary force applied to the high temperature gas is not enough, and the separation efficiency of the molten dust is not high enough, e.g. 50-80%.

(4) When the cylindrical furnace chamber is extended to improve separation efficiency of the molten dust, the heat dissipating surface of the outer sidewall around the furnace chamber increases, which will lead to fall of temperature in the furnace and the coal dust in the furnace solidifies and cannot be separated in molten state.

Due to the disadvantages as previously discussed, clean combustion of coal is still a problem in coal combustion. In some industries which have strict requirements to the cleanliness of the fuel, e.g. ceramic industry and glass industry, the separation efficiency of the coal dust is only about 50-80%, which cannot meet the requirement of actual use. The separation efficiency must reach more than 95%, or even more than 99.5%. Therefore, at present, only fuel of high cleanliness, such as fuel oil, natural gas or petroleum coke having little ash, can be used. Cheap coal available in the market cannot be used to reduce cost.

In coal fired power generation field, coal powder cyclone furnace is an advanced combustion device. The cyclone furnaces uses the combustion air from the air intake device to centrifugally rotate the high temperature gas generated in combustion of the coal powder in the cyclone furnace to separate out the molten coal dust in the high temperature gas. However, the separation efficiency of the molten coal dust is desirable, e.g. about 50-70%, which causes the coal dust to adhere to the sidewall of the furnace and affects heat transfer. Therefore, it is very difficult to efficiently separate out molten dust in the fuel gas of the cyclone furnace in power industry.

In solid fuel gasification, solid material heating and melting, glass smelting or metallurgy industry involving high temperature chemical reaction, there is still no effective method and equipment which can separate out molten dust in the high temperature gas efficiently. Therefore, at present, to avoid generating a large amount of molten dust in high temperature gas, the following methods are used.

(1) Reducing the temperature of high temperature chemical reaction, so as to avoid generating a large amount of molten dust in high temperature gas.

(2) When a large amount of molten dust is generated in high temperature gas, feeding low temperature gas to quickly cool the high temperature gas, so that the molten dust in the high temperature gas condenses to solid.

(3) Using clean fuel, such as fuel oil or natural gas.

(4) Adding large size particles of the material to be melted in high temperature gas, so as to prevent the powder material from dispersing into the high temperature gas and melting.

(5) Using electric arc furnace to heat material directly, instead of using high temperature gas.

However, the methods as discussed previously inevitably reduces productivity and energy utilization efficiency and increase cost of production.

In solid fuel gasification, especially in coal gasification, fixed bed gas producer is generally used. The dust in the coal is needed to be removed in solid state, which requires the gasification temperature lower than the melting temperature of the dust in the coal, such as 1100-1250° C. The gasification efficiency of the coal in low temperature is low. The heat value of the coal gas is not high enough. The coal gas also contains a large amount of tar which may pollute the environment. Additionally, the coal used for gasification is relatively expensive.

As to natural gas made from coal, Chinese patent application number CN 200610075185.8, titled "Natural gas or hydrogen gas made from coal", discloses a method for separating out coal dust, in which high temperature inflammable gas containing molten coal dust is mixed with cool inflammable gas. Rapid cool causes the molten coal dust to solidify to be collected via a cyclone collector. However, the method as disclosed in CN 200610075185.8 cannot collect the heat in the high temperature inflammable gas, and a complex process is needed to produce the high temperature vapor used for coal gasification. Additionally, the heat transfer efficiency is less than 80%.

In industrial furnace used in glass, steel rolling and metallurgy, high cleanliness fuel, for instance fuel oil or natural gas, is required. However, the temperature of the fuel gas from the industrial furnace is very high. If a regenerative heat exchanger can be used to recycle the residual heat in the gas for heating the oxygen containing gas to a high temperature, the heated oxygen containing gas can acts as the gasification agent of the coal powder. The residual heat in the gas of the industrial furnace can be effectively utilized, which facilitates generation of fuel gas at a temperature higher than the melting point of the coal dust and improves the heat transfer efficiency of the coal gas. Therefore, instead of using fuel oil or natural gas, coal powder can also be used in these furnaces, to reduce the cost of production. However, at present, there is no effective device to separate out molten dust in high temperature gas. Therefore, using fuel gas of industrial furnace to heat oxygen containing gas and gasify the coal powder to generate coal gas still cannot be realized.

In glass production, glass tank furnace which uses regenerative heat exchanger to collect the residual heat in the fuel gas has desirable heat efficiency. In glass tank furnace, glass batch floating on the liquid glass is heated by radiative heat transfer from the fire and melts. In fact, the glass raw material only absorbs about 25-30% of the heat generated by combustion of the fuel. The rest 70-75% of the heat is dissipated via the furnace surface or is taken away by the fuel gas. If the glass batch is sprayed into the high temperature gas in the form of powder, the glass batch will melt quickly because the powder material has high specific surface area and desirable heat transfer efficiency. Therefore, glass tank furnace smaller than conventional glass tank furnace is adequate to melt the glass batch of the same weight, which not only reduces surface heat dissipation of the glass tank furnace, but also reduces fuel gas generated. However, the glass batch is sprayed into the high temperature gas in the form of powder. The high temperature gas contains a large amount of molten glass dust. What is needed is, therefore, a device which can efficiently separate out the molten glass batch in the high temperature gas. The heat in the high temperature gas can be recycled via a dividing wall type heat exchanger or a regenerative heat exchanger, so as to remarkably reduce energy consumption in glass production.

In metallurgical chemistry, such as being disclosed in chapter III of Metallurgical Engineering Design published in June, 2006 by Chinese Metallurgical Industry Press, flash smelting furnaces are widely used due to high heat efficiency. However, the large amount of dust content in the gas may block the funnel uptake and the heat recovery boiler. If a device which can efficiently separate out molten dust in high temperature gas is provided, the cleaned high temperature gas can be conveyed to the heat exchanger for recycling the heat which can be used to heat the oxygen containing gas in the flash melting furnace, so as to recycle the residual heat in the high temperature gas and improve environment.

In metallurgy chemistry, especially in iron making industry, blast furnaces are widely used. In blast furnace iron making process, granular or bulk iron ore and hard coke are added into the blast furnace for mixing. In the blast furnace, the iron ore is reduced into iron in high temperature reductive circumstances. The granular or bulk iron ore has small specific surface area, the heat transfer and iron reduction reaction is very slow, which may lead to consumption of a large amount of hard coke and heat energy. If a method for separating out molten dust in high temperature gas is provided, the powder iron ore can be dispersed in the high temperature reductive gas. The powder iron ore has big specific surface area and high reduction and heat transfer efficiency. The powder iron ore is melted and reduced to liquid iron and molten slag in the reductive gas quickly. The liquid iron and the molten slag can be recycled via equipment which can be used to separate the liquid iron and the molten slag in the high temperature gas. A heat exchanger is used to recycle the heat in high temperature gas to heat oxygen containing gas. The high temperature oxygen containing gas incompletely burns with the coal powder and generates high temperature reductive gas. In this regard, no hard coke or little hard coke is used.

In refractory material production, electric arc furnace is used to directly heat the refractory raw material, to melt electric smelting zirconia corundum brick, which consumes a large amount of electric energy and leads to high cost of production.

Additionally, in high temperature chemical reaction, heat exchangers are widely used to efficiently utilize the residual heat of the high temperature gas. However, the high temperature gas in the heat exchanger is needed to be very clean and cannot contain a large amount of molten dust. Otherwise, the heat exchanger may be blocked quickly and cannot function properly. At present, there is no equipment available which can efficiently separate out molten dust in the high temperature gas and, therefore, heat in the high temperature gas containing a large amount of molten dust cannot be recycled by the heat exchanger.

In view of the foregoing, what is need, therefore, is to provide a method and equipment which can efficiently separate out molten dust in high temperature gas, so as to improve productivity, save energy and improve environment.

SUMMARY OF THE INVENTION

One object of the present invention is to provide a method and equipment for efficiently separating out molten dust in high temperature gas and recycling the heat in the high temperature gas.

According to one aspect of the present invention, a method for separating out molten dust in high temperature gas is provided. The method includes the steps of: passing the high temperature gas carrying molten dust through an adhesive separator, so that the molten dust adhering to an inner sidewall of the adhesive separator and being separated from the high temperature gas, the molten dust adhering to the inner sidewall flowing down along the inner sidewall and discharging via a drain outlet defined in a bottom portion of the adhesive separator due to the gravity force; conveying the cleaned high temperature gas to a heat exchanger directly or right after further reacting with/heating materials for cooling and discharging; using the heat recycled by the heat exchanger to heat the gas supplied to the adhesive separator; supplying the gas heated by the heat exchanger into the adhesive separator directly or after further reaction, the heat absorbed from the heat exchanger alone or together with the heat generated in the further reaction keeping the temperature of the gas flowing out of the adhesive separator higher than the melting point of the dust.

Compared with the prior art, the embodiment of the present invention uses heat exchanger to recycle the heat in the cleaned high temperature gas and the recycled heat is further used to heat the gas flow into the adhesive separator, which contributes to recycling the heat of the high temperature gas and increasing the temperature of the high temperature gas flowing out the adhesive separator, so that the temperature of the high temperature gas keeps higher than the melting point of the molten dust. Therefore, the disadvantage in the prior art, i.e. extending the length of the chamber of the adhesive separator may cause the temperature of the high temperature gas to fall to a temperature lower than the melting point of the dust and the dust cannot be separated out and discharge efficiently, can be overcome. Additionally, improvement of separation efficiency of the molten dust can avoid block of the heat exchanger, so that the heat of the high temperature gas can be recycled more easily and efficiently.

According to one aspect of the method for separating out molten dust in high temperature gas of the present invention, the heat exchanger is a regenerative heat exchanger. Via controlling reversing operation time of the regenerative heat exchanger, the temperature of the cleaned high temperature gas flowing out of the adhesive separator keeps higher than the melting point of the dust. Operation principle of the regenerative heat exchanger is disposing two sets of regenerators at two sides of the adhesive separator. After a certain period of time, the two sets of regenerators alternately reverse to work. Therefore, combination of the regenerative heat exchanger and the adhesive separator can maintain the temperature of the high temperature gas containing dust from flowing into the adhesive separator to being cleaned and flowing out of the adhesive separator. Thus, temperature fall of the high temperature gas in the chamber due to extending the length of the chamber of the adhesive separator to improve the separation efficiency of the molten dust is overcome. According to test, when the temperature of the high temperature gas containing molten dust introduced into the adhesive separator is 1650° C., and the reversing operation time of the combination of the adhesive separator and the regenerative heat exchanger is 1 hour/time, the temperature of the cleaned high temperature gas flowing out of the adhesive separator is 1450° C. When the reversing operation time is reduced to 30 minutes/time, the temperature of the cleaned high temperature gas flowing out of the adhesive separator can be raised to 1550-1600° C.

According to one aspect of the method for separating out molten dust in high temperature gas of the present invention, when the ratio of the inner sidewall area of the adhesive separator to the flow rate of the high temperature gas to be processed is more than $1(m^2)/10000(m^3/h)$, the separation efficiency of the molten dust in the high temperature gas is more than 95%. When the ratio of the inner sidewall area of the adhesive separator to the flow of the high temperature gas is more than $1(m^2)/1000(m^3/h)$, the separation efficiency of the molten dust in the high temperature gas can arrive at more than 99%. In view of the foregoing, the temperature raise of the heat exchanger to the gas flowing into the adhesive separator can enable the area of the inner sidewall of the adhesive separator to be improved considerably, so that control of the ratio of the inner sidewall area of the adhesive separator to the flow rate of the high temperature gas is realized. Therefore, purifying efficiency of the high temperature gas is improved. Additionally, the regenerator will not be blocked by the molten dust adhering to the regenerator that has not been completely separated from the high temperature gas, and the heat recycle efficiency can be further improved.

According to one aspect of the method for separating out molten dust in high temperature gas of the present invention, the adhesive separator is a centrifugal adhesive separator, or a filter adhesive separator, or a combination of the centrifugal adhesive separator and the filter adhesive separator. When a centrifugal adhesive separator is used, the high temperature gas containing molten dust rotates in the chamber of the centrifugal adhesive separator. The molten dust in the high temperature gas is thrown out of the high temperature gas and adheres to the inner sidewall of the adhesive separator due to the centrifugal force, thereby separating the molten dust from the high temperature gas. When a filter adhesive separator is used, the high temperature gas containing molten dust passes through the space between filter layers stacked by filter material. The molten dust adheres to the filter material and is separated from the high temperature gas.

According to one aspect of the present invention, an adhesive separator for use in the method for separating out molten dust in high temperature gas is provided. The adhesive separator is a centrifugal adhesive separator including a housing, a chamber, at least one gas inlet, at least one gas outlet and at least one drain outlet. The chamber is enclosed by the inner sidewall of the adhesive separator and generally has a cylindrical profile. The gas inlet and the gas outlet are disposed at two ends of the housing and each is in communication with the chamber. The drain outlet is disposed at a lower side of the housing and is in connected to the bottom portion of the chamber. The inner sidewall of the adhesive separator is formed with a number of air rotating guide bars each being tangent to the axis of the chamber. When the high temperature gas passes through the chamber, the air rotating guide bar enables the high temperature gas to rotate in the chamber of centrifugal adhesive separator and generate a centrifugal force. The centrifugal force can separate out the molten dust in the high temperature gas. To improve the separation efficiency of the dust, the area of the inner sidewall can be increased via extending the length of the chamber, so that the separation efficiency of the molten dust can reach more than 95%. Therefore, the disadvantage in the prior art that the air damper cannot be freely disposed to apply adequate centrifugal rotary force to the high temperature gas is overcome.

According to one aspect of the present invention, the air rotating guide bar is a projecting bar or a spring shape spiral guide bar integrally formed on the inner sidewall of the adhesive separator, or a spring shape spiral guide bar disposed in the chamber of the adhesive separator after being formed separately.

According to one aspect of the present invention, the adhesive separator includes more than one chamber. The gas inlet and the gas outlet are situated at different sides of the housing. The more than one chamber is connected in parallel and shares a gas inlet, a gas outlet and a drain outlet. A number of chambers in parallel can divide a large amount of high temperature gas into a number of small gas flows. The small flows of high temperature gas can be cleaned respectively, thereby remarkably increasing the contact area of the high temperature gas with the inner sidewall and improving the separation efficiency of the molten dust. Additionally, the structure of the chambers connected in parallel will not increase the surface area of the housing. Therefore, heat dissipation is reduced. The molten dust does not solidify due to excessive temperature fall before desirable separation efficiency is reached. The molten dust adhering to the inner sidewall can drain out via the drain outlet smoothly. According to test results, when the adhesive separator as previously described is used, the separation efficiency of the molten dust can reach 95-100%.

According to one aspect of the present invention, more than one chamber of the centrifugal adhesive separator is stacked and spaced by cylindrical refractory bricks. The cylindrical refractory brick generally has a square or rectangular cross section. The air rotating guide bar is formed on the inner sidewall of the cylindrical refractory brick or directly formed in the chamber of the cylindrical refractory. The structure as previously described may facilitate stacking and maintaining of the adhesive separator. Additionally, there is space between adjacent cylindrical refractory bricks. The adhesive separator does not break due to expansion or contraction of the refractory material when the temperature changes. Therefore, crack in the refractory material due to temperature change is avoided and the life span of the centrifugal adhesive separator is prolonged.

According to one embodiment of the present invention, an adhesive separator for use in the method for separating out molten dust in high temperature gas as previously described is provided. The adhesive separator is a filter adhesive separator including a housing, a gas inlet, a filter layer, a gas outlet and a drain outlet. The filter layer is stacked by filter material having space disposed therebetween. The filter material includes metal material, refractory material, raw mineral material, solid fuel, or combination thereof. The filter adhesive separator can use various kinds of filter material, which can facilitate the usage of raw materials or intermediate products produced in the high temperate chemical reaction. Surface of the filter material forms the inner sidewall of the adhesive separator. Compared with centrifugal adhesive separator, the filter adhesive separator has a much bigger inner surface area and a much smaller space between the chambers. Therefore, the separation efficiency of the molten dust is much higher. According to test, the separation efficiency can reach 99-100%.

According to one aspect of the present invention, the filter layers have a grid structure formed by multiple layers, rows and columns stacked by a number of rectangular refractory bricks. The space between the refractory bricks defines a number of chambers. Due to the block of each layer to refractory bricks, the high temperature gas is in turbulent condition when passing through the grid chambers. The molten dust in the turbulent high temperature gas scours and adheres to the inner sidewall of the adhesive separator. In view of the foregoing, as long as adequate layers of refractory bricks are available, desirable separation efficiency can be realized. Additionally, the resistance of the filter layer having the structure as previously described to the high temperature gas can be adjusted via adjusting the space between adjacent refractory bricks. Therefore, compared with filter layers stacked by refractory materials, raw mineral materials or solid fuels having irregular shape, the filter layers as previously described have smaller resistance, which can reduce the resistance of the filter adhesive separator to the high temperature gas.

According to one embodiment of the present invention, a method for producing inflammable gas is provided. The method includes the steps of: (1) using a heat exchanger to heat oxygen containing gas or vapor containing gas to 200-1600° C., the heated oxygen containing gas or vapor containing gas acting as gasification agent; (2) dispersing powder solid fuel in the gasification agent at the temperature of 200-1600° C., the gasification agent reacting with the powder solid fuel to generate high temperature inflammable gas containing CO and $H_2$ and molten dust having a temperature higher than the melting point of the dust in the solid fuel; conveying the high temperature inflammable gas containing molten dusts into the adhesive separator to separate out molten dust and output cleaned high temperature inflammable gas; or supplying the gasification agent having a temperature of 200-1600° C. to the filter type separator which uses granular or bulk solid fuel as filter material, the granular or bulk solid fuel reacting with the gasification agent to generate high temperature inflammable gas containing CO and $H_2$ and molten dust having a temperature higher than the melting point of the dust in the solid fuel, the molten dust being filtered and separated by the unreacted granular or bulk solid fuel, to obtain cleaned high temperature inflammable gas, the filter material consumed in the adhesive separator being replenished by granular or bulk solid fuel feeding device; and (3) introducing the cleaned high temperature inflammable gas to the heat exchanger of step (1) and cooling to a temperature lower than 800° C. before discharging, using the heat recycled to heat the oxygen containing gas or vapor containing gas in step (1). The heat exchanger is a dividing wall type heat exchanger or a regenerative heat exchanger. The oxygen containing gas or vapor containing gas is air, oxygen, vapor or combination thereof. The solid fuel is coal, petroleum coke, biomass material, carbon containing mineral fuel, household garbage or industrial waste containing inflammable goods, or combination thereof.

Producing inflammable gas using the method for separating out molten dust in high temperature gas in accordance with the present invention has the following advantages. First, the inflammable gas produced does not contain tar and, therefore, does not pollute the surroundings. Second, the separation efficiency of the molten dust in the high temperature gas can reach more than 99.5%. The inflammable gas produced contains very little dust and is as clean as the fuel oil or natural gas. Third, heat transfer efficiency is higher than 90%, which is much higher than that of the traditional gas production technology, e.g. 60-70%. Fourth, due to high temperature of the gasification reaction, there is no strict requirement to the quality of the coal. Even common quality coal can be used. Therefore, compared with traditional gas production technology, the cost of production decreases 20-30%. Fifth, in the present invention, the gasification agent is heated by the heat exchanger before gasifying the fuel. Gasification efficiency of the fuel is remarkably improved. Even house hold garbage or industrial waste containing inflammable material can be used as fuel, which can facilitate purification and disposal of house hold garbage and industrial waste.

According to one embodiment of the present invention, a method for producing high temperature inflammable gas and using the high temperature inflammable gas to heat material is provided. The method includes the steps of: (1) Using the heat exchanger to heat the oxygen containing gas or vapor containing gas to 500-1600° C.; (2) Dispersing powder solid fuel into the oxygen containing gas or the vapor containing gas at the temperature of 500-1600° C., the powder solid fuel reacting with the oxygen containing gas or the vapor containing gas to generate high temperature inflammable gas containing CO and $H_2$ and molten dust having a temperature higher than the melting point of the dust in the solid fuel, the high temperature inflammable gas containing molten dust being introduced to the adhesive separator to separate out the molten dust and output cleaned high temperature inflammable gas; (3) Supplying the cleaned high temperature inflammable gas into an industrial furnace, after being heated, the high temperature inflammable gas burning with the oxygen containing gas fed into the industrial furnace to generate a high temperature gas of 1200-2000° C. to heat the material in the industrial furnace; (4) Conveying the gas to the heat exchanger of steps (1) and (3) for cooling and discharging after heating the material in the industrial furnace. Using the energy recycled by the heat exchanger to heat the oxygen containing gas and/or vapor containing gas in step (1) and step (3).

The industrial furnace is a glass melter, a metallurgical furnace or a steel rolling heating furnace.

Using the method for separating out molten dust in the high temperature gas to produce inflammable gas and using the inflammable gas to heat material change the technology of using gas in traditional industrial furnace. The gas in the industrial furnace can be directly used to exchange heat with the heat exchanger to heat gasification agent. Via using high temperature gasification agent to gasify solid fuel to generate inflammable gas having a temperature higher than the melting point of the dust in the solid fuel, the residual heat in the gas of the industrial furnace can be utilized effectively to improve heat efficiency. According to test, the heat efficiency of the industrial furnace which uses the method of the present invention increase about 30% relative to that of the industrial furnace using traditional methods. Compared with traditional furnace using coal gas, the furnace heated by the high temperature inflammable gas produced in accordance with the present invention has a much higher temperature, even as high as the temperature of the industrial furnace using fuel oil or natural gas. The separation efficiency of the adhesive separator for separating out molten dust in high temperature inflammable gas can reach 99.5%. Dust content in the inflammable gas produced is very low, almost as clean as the fuel oil and the natural gas. Therefore, the inflammable gas can be used to substitute fuel oil or natural gas used in industrial furnace, and reduces the cost by 50%.

According to one embodiment of the present invention, an iron making method is provided. The iron making method includes the steps of:

(1) Using a heat exchanger to heat oxygen containing gas to 500-1600° C., the heated oxygen containing gas acting as oxidant and being divided into a first portion and a second portion.

(2) Mixing the first portion of the oxidant in step (1) with fuel and powder iron ore, the oxidant incompletely combined burning with the fuel to generate high temperature reductive gas containing CO and $H_2$ having a temperature higher than 1500° C., the powder iron ore melting in the high temperature reductive gas and being reduced to deposit liquid iron and molten slag.

(3) Conveying the high temperature reductive gas containing melting iron ore, liquid iron and molten slag into an adhesive separator; the molten iron ore, liquid iron and molten slag adhering to an inner sidewall of the separator; the molten iron ore that has not been completely reduced further being reduced to deposit liquid iron and molten slag in the high temperature reductive gas; the liquid iron and the molten slag draining out from the drain outlet of the adhesive separator and being separated from each other via a skimmer to output cleaned high temperature reductive gas.

(4) Mixing the high temperature reductive gas being separated and cleaned by the adhesive separator with the second portion of the oxidant in step (1) for complete combined consumption to generate high temperature gas having a temperature higher than 1500° C.; The high temperature gas then being introduced to the heat exchanger in step (1) and discharging after being cooled. The heat recycled by the heat exchanger being used to heat the oxygen containing gas in step (1).

According to one aspect of the present invention, before discharging from the drain outlet, the liquid iron and the molten slag collected in the adhesive separator passing through a layer of coal or hard coke, so that the molten iron ore that has not been reduced completely can further deposit liquid iron and molten slag in the filter layer of coal or hard coke.

According to one aspect of the present invention, the adhesive separator is a centrifugal adhesive separator or a filter adhesive separator. The filter material in the filter adhesive separator is coal or hard coke. When coal or hard coke is used as the filter material in the adhesive separator, the molten iron ore that has not been completely reduced can further deposit liquid iron and molten slag in the filter layer, so that the liquid drained out from the drain outlet does not contain iron ore or contain very little iron ore.

According to one embodiment of the present invention, another iron making method is provided. The iron making method includes the steps of:

(1) Using heat exchanger to heat oxygen containing gas to 500-1600° C., the heated oxygen containing gas acting as oxidant and being divided into a first portion and a second portion;

(2) Mixing the first portion of the oxidant in step (1) with fuel, and the fuel incompletely burning with the first portion of the oxidant to generate high temperature reductive gas containing CO and $H_2$ having a temperature higher than 1500° C.

(3) Introducing the high temperature reductive gas to an adhesive separator which uses granular or bulk iron ore as filter layer; the granular or bulk iron ore being heated to melt in the high temperature reductive gas and deposit liquid iron and molten slag; the liquid iron and the molten slag discharging from a drain outlet of the adhesive separator and further being separated from each other via a skimmer.

(4) Mixing the high temperature reductive gas separated and cleaned by the adhesive separator with the second portion of the oxidant in step (1); the cleaned high temperature reductive gas completely burning in the oxidant to generate high temperature gas having a temperature higher than 1500° C.; the high temperature gas being introduced to the heat exchanger in step (1) and discharging after being cooled; the heat recycled by the heat exchanger being used to heat the oxygen containing gas in step (1).

According to one aspect of the present invention, the liquid iron and the molten slag collected in the adhesive separator pass through a layer of coal or hard coke before discharging via the drain outlet, so that the molten iron ore that has not been completely reduced can further deposit liquid iron and molten slag in the coal or hard coke filter layer.

Compared with traditional blast furnace iron making technology, iron making method according to the present invention does not use hard coke or only use very little hard coke. Therefore, cost of the hard coke can be reduced by 50-100%. In the traditional blast furnace iron making technology, several sets of big hot blast stoves are used to preheat combustion air in turn. Due to the heat recycled from the high temperature gas, there is no need to use blast air stove(s) in the present invention. Volume of the equipment can be reduced considerably. The heat dissipated from the outer surface of the furnace is reduced by more than 50%. The structure of the equipment for iron making is also more simple and compact than that of the traditional blast furnace.

According to one embodiment of the present invention, a method for melting powder solid material is provided. The method includes the steps of:

(1) Using a heat exchanger to heat oxygen containing gas to 500-1600° C.;

(2) Introducing oxygen containing gas at the temperature of 500-1600° C. in step (1) to a reaction tower; the mixture of the fuel and the powder solid material burning in oxygen containing gas to generate high temperature gas having a temperature of 1200-2000° C.; the powder solid material being dispersed in the high temperature gas of 1200-2000° C. and melting into molten dust;

(3) Conveying the high temperature gas containing molten dust into an adhesive separator; the liquid dust being separated converging into liquid melts and discharging via a drain outlet; the cleaned high temperature gas flowing out via a gas outlet;

(4) Introducing the cleaned high temperature gas to the heat exchanger in step (1) and draining out after being cooled; Using the heat recycled by the heat exchanger to heat the oxygen containing gas in step (1).

When the method for melting powder solid material of the present invention is used to produce glass, the solid material is glass batch. The liquid melt is liquid glass. The liquid glass from the drain outlet flows to a settling pond to eliminate air bubbles and then enters molding equipment for molding. The molded glass is annealed in an annealing equipment to obtain glass product.

When the method for melting powder solid material of the present invention is used to produce glass, the glass batch is sprayed into the high temperature gas in the form of powder. Within 1 second, the powder glass batch melts to glass liquid. The heat transfer efficiency is very high. In traditional glass melting furnace, a layer of glass batch floating on the glass liquid is melted by the heat transferred from a fire above the glass batch. It will take more than 1 hour to completely melt the glass batch. The heat transfer efficiency is relatively low. According to test, to produce glass of the same weight, volume of the blast furnace according to the present invention is about ⅓ as that of the traditional glass furnace. The heat dissipated by the outer surface of the furnace is reduced by more than 50%, the heat loss due to fuel gas emission is reduced by more than 40%, and the fuel consumption is reduced by more than 40%.

When the method for melting powder solid material of the present invention is used to smelt nonferrous material, the reaction tower is a metallurgical furnace, and the powder solid material is powder sulfide minerals. Compared with the prior art, the metallurgical furnace according to the present invention is combined with the adhesive separator, to effectively separate out the molten dust and output clean high temperature gas. The high temperature gas is introduced to the heat exchanger to recycle heat which can be used to heat oxygen containing gas. According to test, the heat efficiency is remarkably improved and the fuel consumption is reduced by about 30%.

According to one embodiment of the present invention, a method for melting refractory brick is provided. The method includes the steps of:

(1) Using a heat exchanger to heat oxygen containing gas to a temperature of 800-1600° C.;

(2) Dispersing fuel into the oxygen containing gas at a temperature of 800-1600° C. in step (1), the fuel burning with the oxygen containing gas to generate high temperature gas having a temperature of 1600-3000° C.

(3) Introducing the high temperature gas at a temperature of 1600-3000° C. to an adhesive separator which uses refractory raw material as filter layer; The refractory raw material being heated in the high temperature gas at a temperature of 1600-3000° C. and melting into liquid and flowing out from a drain outlet; After casting molding and cooling, refractory brick having desirable shape being obtained; The cleaned high temperature gas flowing out via a gas outlet of the adhesive separator;

(4) Mixing the cleaned high temperature gas with low temperature gas; The mixed gas having a temperature of lower than 1800° C. The mixed gas being introduced into the heat exchanger in step (1) and flowing out after being cooled. The heat recycled by the heat exchanger being used to heat the oxygen containing gas in step (1).

According to one embodiment of the present invention, the main ingredient of the refractory material is $Al_2O_3$, $ZrO_2$, $SiO_2$ or combination thereof.

The method for melting refractory brick according to the present invention can reach the same temperature as that of an electric arc furnace when uses fuel oil or natural gas, which can meet the temperature requirement for producing zirconia corundum brick. According to test, the zirconia corundum brick produced via the equipment of the present invention has the same quality as that produced by traditional electric arc furnace, while the cost of the fuel oil according to the present invention is only 60% of the cost of the electric energy used for producing zirconia corundum brick via traditional electric arc furnace.

Summarizing the above, in solid fuel combustion, solid fuel gasification, solid material melting, glass production, metallurgical chemistry reaction and other fields which involve high temperature chemical reaction, when molten dust is need to be separated from the high temperature gas, the method for separating out molten dust in high temperature gas according to the present invention can be used, to improve productivity, save energy and improve environment.

BRIEF DESCRIPTION OF THE DRAWINGS

Figure 1:
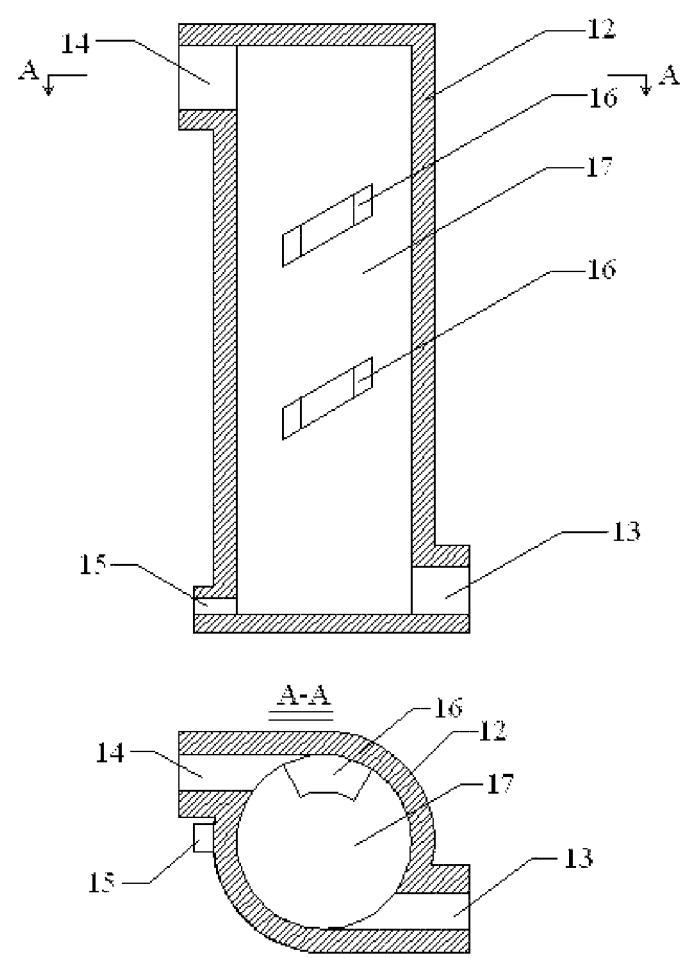
Figure 2:
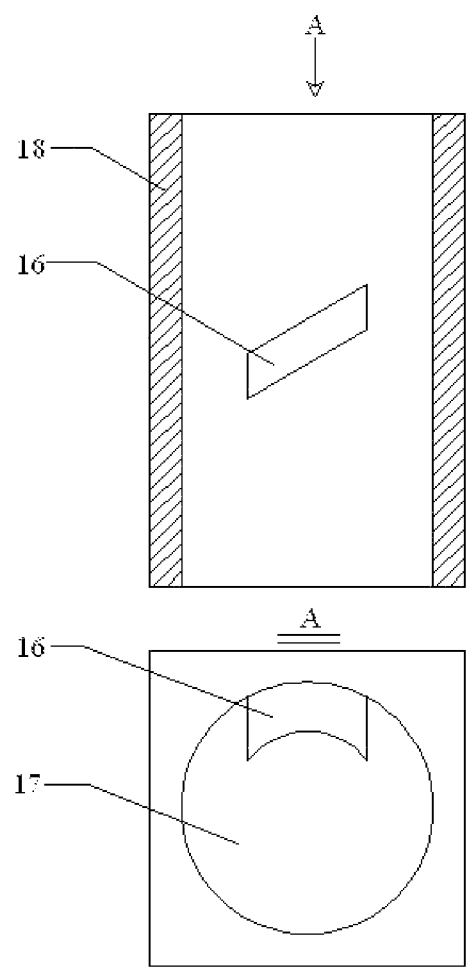
Figure 3:
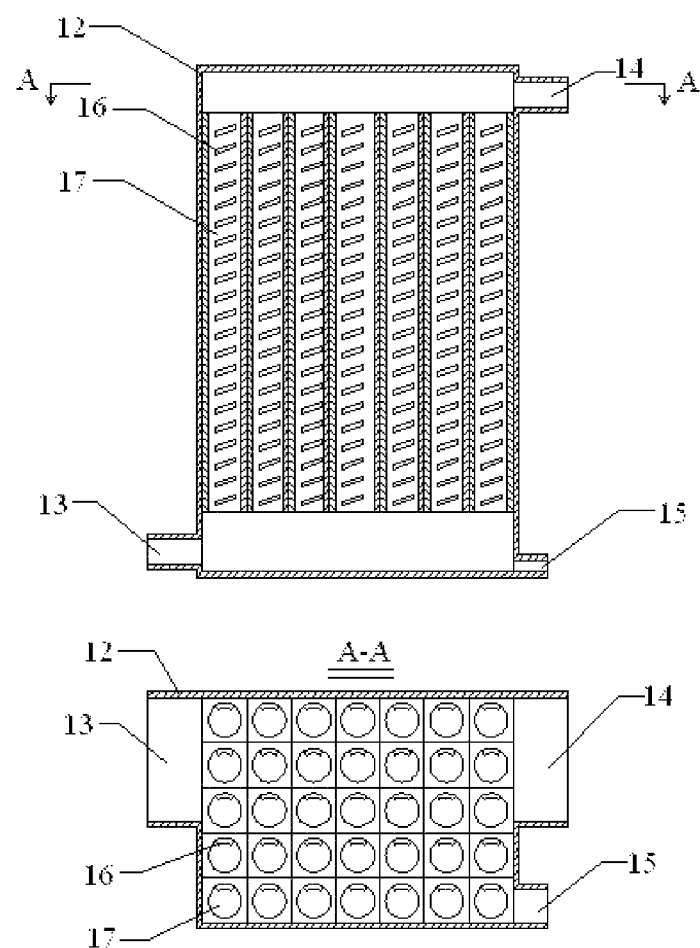
Figure 4:
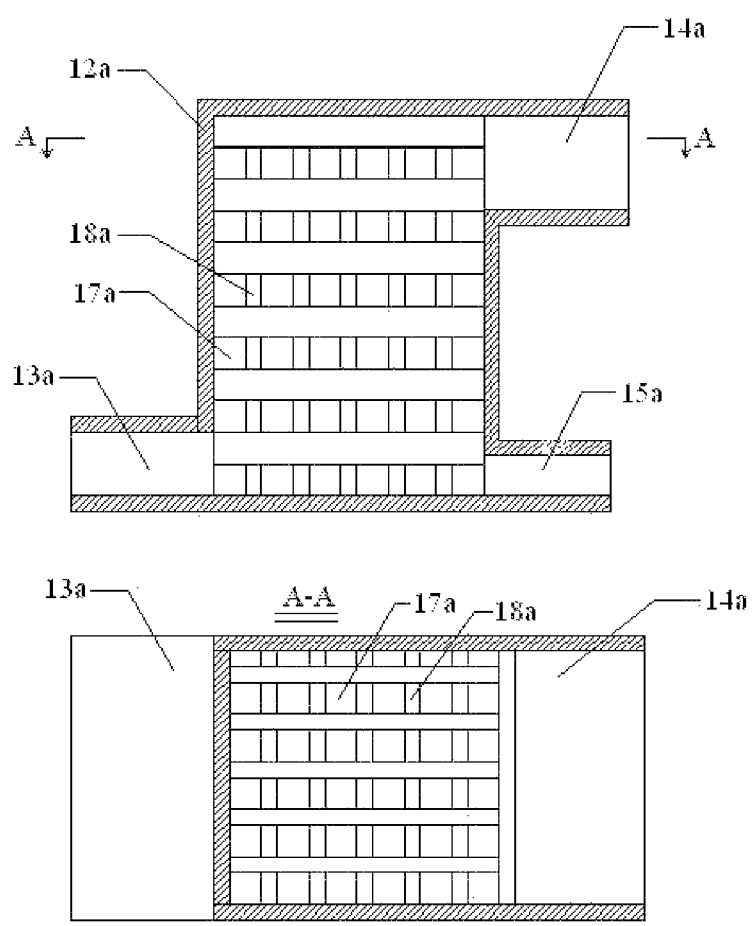

Having thus described the invention in general terms, reference will now be made to the accompanying drawings, which are not necessarily drawn to scale, and wherein:

FIG. 1 depicts a centrifugal adhesive separator according to a first embodiment of the present invention;

FIG. 2 depicts a refractory brick for use in the centrifugal adhesive separator;

FIG. 3 depicts a centrifugal adhesive separator according to a second embodiment of the present invention;

FIG. 4 depicts a filter adhesive separator according to one embodiment of the present invention; and FIG. 5 to FIG. 13 depicts various kinds of furnaces which uses the method for separating out molten dust in high temperature gas according to the present invention.

DETAILED DESCRIPTION OF THE INVENTION

The term of "molten dust" in the present invention refers to dust which has a temperature higher than its melting point and being in a liquid condition, including but not limited to melt-out product of metal, raw mineral material, or combination thereof, such as coal dust or powder metal iron. The high temperature gas has a temperature higher than the melting point of the dust. The molten dust in the high temperature gas comes from: 1) the molten dust in the high temperature gas before the high temperature gas enters the chamber of the adhesive separator; 2) the molten dust generated in physical and/or chemical reaction between dispersed solid material or solid fuel and the gas in the chamber of the adhesive separator; 3) the molten dust generated in physical and/or chemical reaction between the gas introduced into the filter adhesive separator and the filter material in the filter adhesive separator.

The present invention uses adhesive separator to separate out molten dust in high temperature gas, and uses heat exchanger to cool the high temperature gas to recycle the heat. The heat recycled by the heat exchanger can be used to heat the gas directly enters the adhesive separator or enters the adhesive separator after reaction, so as to effectively separate out the molten dust in the high temperature gas and recycle the heat. The adhesive separator according to the present invention includes a centrifugal adhesive separator and a filter adhesive separator. Embodiments of the present invention which use different types of adhesive separator will be described in more detail as following.

Referring to FIG. 1, the centrifugal adhesive separator according to a first embodiment of the present invention includes a housing 12, a gas inlet 13, a gas outlet 14, a drain outlet 15 and a gas rotating guide bar 16. The housing 12 generally has a cylindrical profile and inner sidewall of the housing 12 encloses a cylindrical chamber 17. The gas inlet 13 and the gas outlet 14 are defined at two sides of the housing 12 and are in tangent communication with the chamber 17.

The drain outlet 15 is defined at a lower side of the housing 12 and is in communication with the bottom portion of the chamber 17. The gas rotating guide bar 16 is formed on the inner sidewall of the housing 12, and is tangent to the axis of the chamber 17 obliquely. The housing 12 is a refractory lined metal housing, or a refractory lined water-cooled metal housing, or a water-cooled metal housing, or a refractory material housing, or combination thereof.

In use, high temperature gas containing dust enters the chamber 17 of the adhesive separator via the gas inlet 13. Because the gas inlet 13 is tangent to the chamber 17 and the gas rotating guide bar 16 can guide the gas, the high temperature gas advances spirally in the chamber 17 and scours the inner sidewall of the housing 12. Due to the centrifugal force, the molten dust in the high temperature gas is hurled out of the high temperature gas and adheres to the inner sidewall of the centrifugal adhesive separator. The molten dust flows down to the drain outlet 15 at the bottom of the adhesive separator due to the gravity force and flows out of the adhesive separator through the drain outlet 15. The cleaned gas flows out of the adhesive separator through the gas outlet 14. Because the temperature of the high temperature gas is higher than the melting point of the dust, the dust does not solidify before be discharged via the drain outlet 15. It is appreciated that, the number, shape and size of the gas inlet 13, the gas outlet 14, the drain outlet 15 and the gas rotating guide bar 16 can be adjusted according to actual requirement.

The centrifugal adhesive separator can be stacked by refractory bricks 18 illustrated in FIG. 2. The chamber 17 in the refractory brick 18 has a cylindrical profile. The outer sidewall of the refractory brick 18 generally has a circular shape, a square shape or a rectangular shape. On the inner sidewall of the refractory brick 18, gas rotating guide bar 16 being tangent to the axis of the chamber 17 is formed.

Referring to FIG. 3, to timely process a large amount of high temperature gas and ensure the separation efficiency of the molten dust, a second embodiment of the centrifugal adhesive separator according to the present invention is provided. In the second embodiment of the centrifugal adhesive separator, the housing 12 has a substantially cube or cuboid profile. A number of cylindrical chambers 17 stacked and spaced in parallel by refractory bricks are provided in the housing 12. The chambers 17 are arranged in multiple rows and columns and share a gas inlet 13, a gas outlet 14 and a drain outlet 15. In use, a large flow of high temperature gas entering the different chambers via the gas inlet 13 is divided into a number of smaller the high temperature gas flows. The smaller flows of high temperature gas are cleaned in the chambers 17 respectively and join into one flow and then discharge via the gas outlet 14. The molten dust adhering to the inner sidewall of the chambers flows to the bottom portion of the adhesive separator due to the gravity force and joins into one flow and discharge via the drain outlet 15. The chambers in parallel manner can considerably increase the area of the inner sidewall, which can improve adhering and separating ability of the adhesive separator to the molten dust. Via controlling the number of row, column and layer of the refractory bricks, effective purification of the molten dust can be readily realized. Compared with extending the length of the separator, the structure of the adhesive separator according to this embodiment can reduce the heat dissipating area and maintain the heat.

Although the centrifugal adhesive separator illustrated in FIG. 3 has a number of chambers 17 arranged in parallel, according to other embodiments of the present invention, a number of chambers 17 of the centrifugal adhesive separator can also be arranged in series, or be arranged in a mixed structure of in series and in parallel.

According to another embodiment of the present invention, to guide the high temperature gas effectively, the gas rotating guide bar 16 of the refractory brick 18 and the centrifugal adhesive separator can also be configured as spring spiral guide bar. The spiral guiding bar can be integrally formed with the inner sidewall of the refractory brick, or be formed independently and then be disposed in the chamber 17 of the refractory brick or the centrifugal adhesive separator.

Referring to FIG. 4, the filter adhesive separator of the present invention includes a housing 12*a*, a gas inlet 13*a*, a gas outlet 14*a*, a drain outlet 15*a* and filter layers, in which the housing 12*a* has a substantially cube or cubioc profile. The gas inlet 13*a* and the gas outlet 14*a* are seated at two sides of the housing 12*a* and are in communication with the chamber 17*a*, respectively. The drain outlet 15*a* is disposed at a lower side of the housing 12*a*, and is in communication with the bottom portion of the chamber 17*a*. The filter layer is stacked by a number of rows, columns and layers of rectangular refractory bricks 18*a*. Space between the refractory bricks 18*a* defines a number of chambers 17*a*.

In use, the high temperature gas containing molten dust flows in via the gas inlet 13*a*, and passes through the chambers 17*a* in the filter layer stacked by the filter material. The molten dust adheres to the inner sidewall of the refractory brick, flows through the chambers 17*a* and flows out via the drain outlet 15*a* at the bottom portion of the adhesive separator due to the gravity force or the force applied by the high temperature gas along a same direction as that of the gravity force. The cleaned high temperature gas then flows out via the gas outlet 14*a*.

According to one embodiment of the present invention, the rows, columns and layers of the refractory bricks 18*a* can be adjusted, so as to control the ratio of the total area of the sidewall of the adhesive separator to the flow rate of the high temperature gas, and further purify the dust more efficiently.

In other embodiments of the filter adhesive separator of the present invention, the filter layer in the housing 12*a* may does not use refractory bricks. Instead, the filter layer may be stacked by metal material or solid material which has desirable thickness. The metal material includes scrap copper and scrap ion. The solid material includes hard coke, bulk coal and raw mineral material.

It should be noticed that, in the embodiments as previously described, the adhesive separator (including the centrifugal adhesive separator and the filter adhesive separator) each has a separate gas inlet, a separate gas outlet and a separate drain outlet. However, when the adhesive separator is used together with other equipment(s), the drain outlet, the gas inlet and the gas outlet may be incorporated into one opening.

References will now be made to the drawings, to describe the structure and principle of the furnace which uses the adhesive separator of the present invention to separate out molten dust in high temperature gas and use the heat exchanger to cool the high temperature gas for recycling the heat. However, the present invention is not limited to the embodiments set forth herein. Other method and equipment which uses the method of the present invention to separate out the molten dust in high temperature gas should also fall within the scope of the present invention.

Embodiment 1

Figure 5:
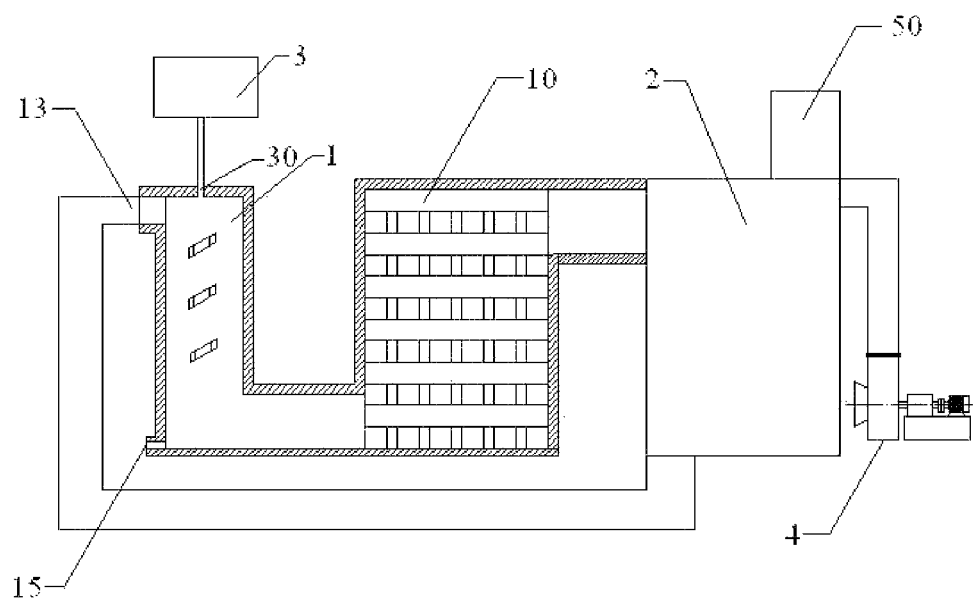

FIG. 5 illustrates a furnace which uses the method for separating out molten dust in high temperature gas according to one embodiment of the present invention. The furnace includes a centrifugal adhesive separator 1, a filter adhesive separator 10, a dividing wall type heat exchanger 2, a fuel or powder material feeding and controlling device 3, a gas input device 4, a fuel inlet 30 and a gas outlet 50. The outlet of the centrifugal adhesive separator 1 is connected to the gas inlet of the filter adhesive separator 10. The filter separator 10 and the centrifugal adhesive separator 1 share one drain outlet 15. The dividing wall type heat exchanger 2 includes two pipes. Inlet of one of the pipes is connected to the gas outlet of the filter adhesive separator 10. Outlet of this pipe is the gas outlet 50. Inlet of the other pipe of the dividing wall type heat exchanger 2 is connected to the gas input device 4. Outlet of this pipe is connected to the gas inlet 13 of the centrifugal adhesive separator 1. The fuel inlet 30 is close to the gas inlet 13 of the centrifugal adhesive separator 1. The fuel or powder material feeding and controlling device 3 is connected to the centrifugal adhesive separator 1 via the fuel inlet 30.

The furnace as previously described can be used to produce inflammable gas. The operation principle of the furnace is detailed as following. The oxygen containing gas is introduced, via the gas inlet 13, to the dividing wall type heat exchanger 2 via a gas input device 4. The oxygen containing gas is heated to a temperature of 200-700° C., such as 350° C., and supplies to the centrifugal adhesive separator 1. The powder solid fuel is fed to the centrifugal adhesive separator 1 via the fuel inlet 30 using a fuel or powder material feeding and controlling device 3. The powder solid fuel and the oxygen containing gas experience gasification reaction to generate a high temperature inflammable gas having a temperature higher than the melting point of the dust in the powder solid fuel, such as a high temperature inflammable gas having a temperature of 1600° C. In the centrifugal adhesive separator 1, a portion of the molten dust is separated out from the high temperature inflammable gas containing molten dust before the high temperature inflammable gas enters the filter adhesive separator 10 in connection with the centrifugal adhesive separator 1. After separation of the centrifugal adhesive separator 1 and the filter adhesive separator 10, the molten dust drains out via the drain outlet 15. The cleaned high temperature inflammable gas is introduced into the dividing wall type heat exchanger 2 and transfers heat to the oxygen containing gas. The inflammable gas is cooled to a temperature lower than 800° C., such as 500° C., and then flows out via the gas outlet 50.

According to one embodiment of the present invention, the gas input device 4 is a fan. To improve the heat value of the inflammable gas, water vapor can be added into the gas. Oxygen enriched air generating device or oxygen generating device for improving oxygen content can also be used.

The solid fuel includes coal, petroleum coke, biomass material, carbon containing mineral fuel, house-hold garbage and industrial waste containing inflammable goods, or combination thereof.

Liner of the centrifugal adhesive separator 1 and the material in the filter adhesive separator 10 adopts high quality silica brick, which can endure a temperature as high as about 1600° C. When coal is used as the fuel, dust in the coal generally has a melting point of about 1150-1350° C. Therefore, the temperature in the adhesive separator is required to be controlled as higher than 1350° C., such as 1550° C., which falls in the usage temperature range of high quality silica brick and can also ensure desirable gasification effect.

In the centrifugal adhesive separator 1, the coal powder experiences the gasification reaction as following.
The gasification reaction using air as gasification agent:
$2C+O_2=2CO+221.2$ kJ;
$2CO+O_2=2CO_2+566.0$ kJ;
$C+O_2=CO_2+393.8$ kJ;
$CO_2+C=2CO-172.6$ kJ;

The gasification reaction using water vapor as gasification agent:
$C+2H_2O=CO_2+2H_2-90.2$ kJ;
$C+H_2O=CO+H_2-131.4$ kJ.

According to the chemical equation of the gasification reaction, the gasification reaction which uses air as gasification agent is exothermic reaction, while the gasification reaction which uses water vapor as gasification reaction is endothermic reaction. Improving oxygen content in the air can reduce nitrogen content in the inflammable gas and improve the heat value of the inflammable gas. However, improving oxygen content in the air will lead to temperature raise of the reaction in the centrifugal adhesive separator 1. Sometimes, the reaction temperature in the centrifugal adhesive separator 1 may reach 1600° C., such as 1750° C., which exceeds the usage temperature of the high quality silica brick. If a portion of water vapor is added to act as gasification agent, the gasification reaction of the water vapor with the coal is endothermic reaction, which can decrease the temperature of the gasification reaction in the centrifugal adhesive separator 1. Via adjusting the oxygen content and the water vapor content in the gasification agent, the nitrogen content can be reduced, which can ensure the reaction temperature in the centrifugal adhesive separator 1 be controlled within the usage temperature range of the high quality brick as well as obtain inflammable gas having high heat value. Due to the heat exchanger of the dividing wall type heat exchanger 2, the temperature of the high temperature inflammable gas can be reduced to an appropriate temperature before flowing out. The heat in the high temperature inflammable gas can be effectively used, and the heated oxygen containing gas can be used as gasification agent, which can enhance the gasification effect of the solid fuel.

When a dividing wall type heat exchanger 2 is used, the oxygen containing gas can only be heated to about 200-700° C., which is not desirable. When a regenerative heat exchanger is used, the oxygen containing gas can be heated to about 500-1600° C. Therefore, regenerative heat exchanger is preferable and is used in the following embodiments of the present invention.

Embodiment 2

Figure 6:
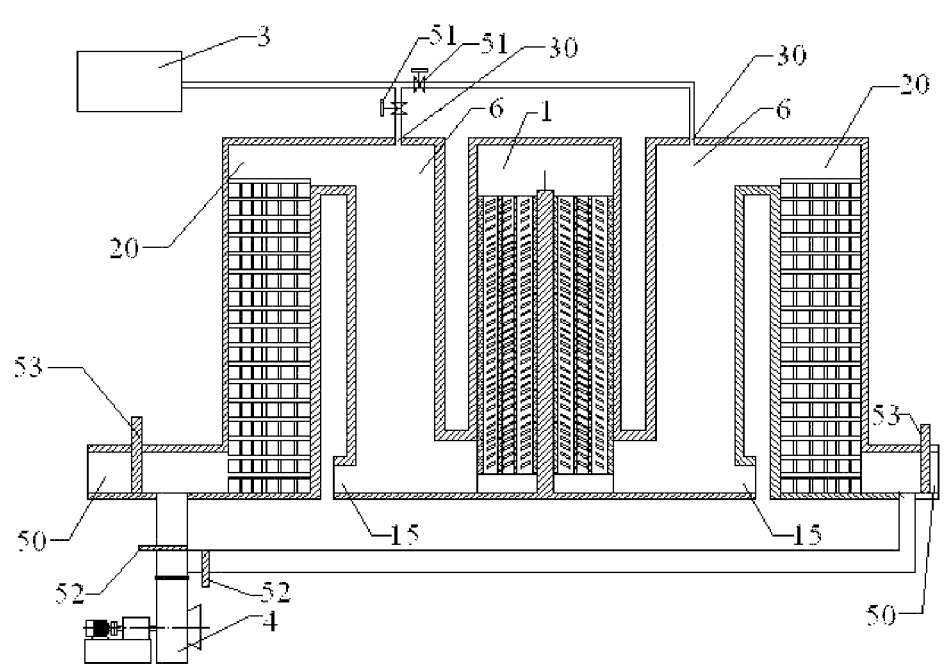

FIG. 6 illustrates a furnace which uses the method for separating out molten dust in high temperature gas according to one embodiment of the present invention. The furnace includes a centrifugal adhesive separator 1, two regenerative heat exchangers 20, two cyclone furnaces or reaction towers 6, a fuel or powder material feeding and controlling device 3, a gas input device 4, two fuel inlets 30, two gas outlets 50, two valves 51, two gas inverting gates 52, and two fuel inverting gates 53. The chamber of the centrifugal adhesive separator 1 is configured to have a symmetrical structure connected in parallel and then in series. Two sets of regenerators of the regenerative heat exchanger 20 are seated at two sides of the centrifugal adhesive separator 1, each being connected to the gas inlet/gas outlet of the centrifugal adhesive separator 1 via the cyclone furnace or reaction tower 6. The fuel or powder material feeding and controlling device 3 is connected to the cyclone furnaces or reaction towers 6 via the valves 50 and the fuel inlets 30. The gas input device 4 is respectively connected to the two sets of regenerators of the regenerative heat exchangers 20. The gas input device 4 is connected or disconnected to the corresponding regenerator via opening or closing the two gas inverting gates 52. The regenerative heat exchanger 20 is connected or disconnected to the gas inlets 50 via opening or closing the fuel gas inverting gates 53.

The operation principle of the regenerative heat exchanger 20 is realized through alternate run of the two sets of regenerators. The operation of the regenerators can be divided into endothermic heating period and exothermic cooling period, to recycle the heat in the high temperature gas. Operation of the two sets of regenerators to recycle the heat in the high temperature gas (hereinafter simplified as reversing operation) is detailed as following: The left side fuel gas inverting gate 53 is closed. The right side fuel gas inverting gate 53 is opened. The left side gas inverting gate 52 is opened. The right side gas inverting gate 52 is closed. The gas input device 4 drives the oxygen containing gas to move from the left side opening gas inverting gate 52 to the left side regenerator. The oxygen containing gas is heated to 500-1600° C., such as 1200° C., in the left side regenerator before entering the left side cyclone furnace or reaction tower 6. In the left side cyclone furnace or reaction tower 6, the oxygen containing gas chemically reacts with the fuel or materials fed by the fuel or powder material feeding and controlling device 3 via the open left side valve 51 (the right side valve is closed), and generate molten dust and high temperature gas, such as molten dust and high temperature gas having a temperature of 1650° C. High temperature gas containing molten dust is introduced into the centrifugal separator 1. The molten dust is collected and drained out from the drain outlet 15. The cleaned high temperature gas passes through the right side cyclone furnace or reaction tower 6 and enters the right side regenerator. The high temperature gas heats the heat storage material in the right side regenerator, with the temperature thereof falling to lower than 800° C., such as 500° C. or 300° C., and then the high temperature gas flows out from the open right side fuel gas inverting gate 53. In this process, the heat storage material in the left side regenerator transfers the heat to the oxygen containing gas, thereby realizing the exothermic cooling period of the heat storage material in the left side regenerator. The heat storage material in the right side regenerator absorbs the heat in the high temperature gas, thereby realizing the endothermic heating period of the heat storage material in the right side regenerator.

After a certain period of time, a reversing operation is carried out. The oxygen containing gas is input from the right regenerator in a reverse direction. The fuel or the material is input from the right side cyclone furnace or reaction tower 6. The cleaned and cooled reaction gas is output from the left side regenerator. The reversing operation is carried out repeatedly in the manner as previously described, so as to use the adhesive separator and the regenerator to separate molten dust and recycle the heat of the high temperature gas containing molten dust.

The furnace illustrated in FIG. 6 can be used to produce inflammable gas. There are two modes of operation of using the furnace as illustrated in FIG. 6 to produce inflammable gas.

Mode A: Inputting powder solid fuel via the fuel or powder materials feeding and controlling device 3. The powder solid fuel and the oxygen containing gas from the gas input device 4 experience gasification reaction alternately in the two side cyclone furnaces 6 according to the reversing operation as previously described. The inflammable gas is output from the two side gas outlets 50 alternately.

Mode B: Preheating the oxygen containing gas inputted by the gas input device 4 via the left side (or right side) regenerator to a temperature of 500-1200° C., such as 1000° C. The preheated oxygen containing gas supplies to the cyclone furnace 6 and completely burns with the powder solid fuel from the fuel or powder material feeding and controlling device 3, to generate high temperature gas and molten dust having a temperature higher than the melting point of the dust in the solid fuel, such as high temperature gas and molten dust of 1700° C. or 1600° C. After the purification of the adhesive separator 1, the molten dust discharges from the drain outlet 15. The cleaned high temperature gas enters the right side (or left side) regenerator to heat the heat storage material therein and discharges from the right side (or left side) gas outlet 50. In this regard, the temperature of the high temperature gas falls to lower than 300° C., such as 200° C. or 150° C. After a certain period of time, the vapor input from the right side (or left side) regenerator via the gas input device 4 is preheated to a temperature of 1450-1600° C., such as 1580° C. The preheated vapor enters the cyclone furnace 6 and experiences gasification reaction with the powder solid material from the fuel or powder material feeding and controlling device 3, to generate high temperature inflammable gas and molten dust containing CO and $H_2$ at a temperature of 1400-1500° C., such as 1450° C. After purification of the adhesive separator, molten dust drains out from the drain outlet 15. The high temperature inflammable gas containing CO and $H_2$ enters the left side (or right side) regenerator. After heating the heat storage material in the regenerator, the temperature of the high temperature inflammable gas containing CO and $H_2$ falls to lower than 500° C., such as 300° C. or 150° C. before flowing out from the left side (or right side) gas outlet 50. In this regard, one side uses vapor as gasification agent, and the output inflammable gas contains more than 95 wt % CO and $H_2$ and has desirable heat value.

The furnace as illustrated in FIG. 6 can also be used to produce glass. The operation for producing class is detailed as following. Input mixture of powder solid fuel and powder glass batch from the fuel or powder material feeding and controlling device to the left side (or right side) reaction tower 6. The oxygen containing gas added by the gas input device 4 is preheated in the left side (right side) regenerator to a temperature of 500-1600° C., such as 1000° C. The preheated oxygen containing gas and the powder solid material experience high temperature combustion reaction in the left side (or right side) reaction tower 6 to reach a temperature of 1200-2000° C., such as 1600° C. The powder glass batch disperses in the high temperature gas having a temperature of 1600° C. and melts quickly. The dust content in the powder solid fuel is also the ingredient of the glass. The high temperature gas is separated in the adhesive separator 1. The glass liquid discharges from the drain outlet 15 to a settling pond. After the glass liquid is molded via a molding machine, the product is transferred to an annealing lehr for cooling, thereby obtaining glass product. The cleaned high temperature gas is input to right side (or left side) regenerator and discharges after cooling. After a certain period of time, a reversing operation is carried out.

The furnace as illustrated in FIG. 6 still can be used to produce non-ferrous metal. In this regard, the reaction tower 6 is a flash smelting furnace, which can be used to melt powder sulfide mineral. Take copper smelting for example. Copper sulfide concentrate particles is added to the left side (or right side) reaction tower 6 via the fuel or powder material feeding and controlling device 3. The oxygen containing high temperature gas is preheated by the regenerative exchanger 20 to a temperature of 500-1600° C., such as 800° C. The copper sulfide concentrate particles mix with the high temperature oxygen containing gas in the left side (or right side) reaction tower 6 and react with the high temperature oxygen containing gas. The reaction generates a temperature of 1200-2000° C., such as 1400° C. At the temperature of 1400° C., the copper sulfide concentrate particles experience oxidation desulfurization and melting reaction, which releases a large amount of heat. The copper matte and the molten slag are collected in the adhesive separator 1 and discharge from the drain outlet 15 to a settling pond. After separation and clarification, the copper matte and the slag drain out via a matte outlet and a slag outlet, respectively. The cleaned high temperature gas enters the right side (or left side) regenerator and is drained out after heat exchange and cooling. After a certain period of time, a reversing operation is carried out.

Embodiment 3

Figure 7:
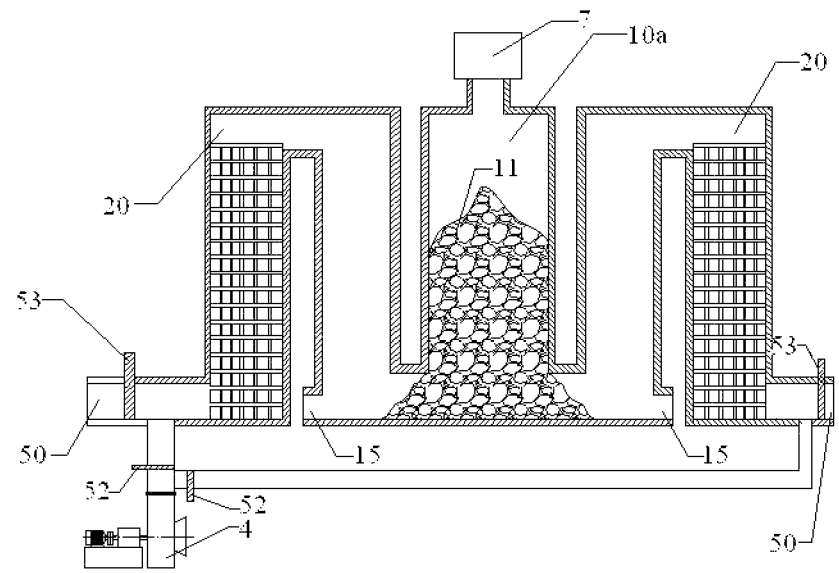

FIG. 7 illustrates a furnace which uses the method for separating out molten dust in high temperature gas according to one embodiment of the present invention. The furnace includes a filter adhesive separator 10a, two regenerative heat exchangers 20, a granular or bulk material feeding device 7, a gas input device 4, two gas inlets 50, two gas inverting gates 52, and two fuel gas inverting gates 53. The filter adhesive separator 10a uses granular or bulk solid fuel 11 as filter layer. Two sets of regenerators of the regenerative heat exchanger 20 are seated at two sides of the filter adhesive separator 10a. The granular or bulk material feeding device 7 is disposed at the top of the filter adhesive separator 10a. The gas input device 4 is connected to the two sets of regenerators of the regenerative heat exchanger 20, respectively. The gas input device 4 is connected or disconnected to a corresponding regenerator via opening or closing the two gas inverting gates 52. The regenerative heat exchanger 20 is connected or disconnected to the air outlet 50 via opening or closing the fuel gas inverting gates 53.

The furnace as illustrated in FIG. 7 can be used to produce inflammable gas. The principle of producing the inflammable gas is detailed as following. The oxygen containing gas is input to the left side regenerator via the gas input device 4. The oxygen containing gas is heated to 200-1600° C. in the left side regenerator, such as 1300° C., and then conveyed to the adhesive separator 10a. The granular or bulk solid fuel 11 is fed to the filter adhesive separator 10a via the granular or bulk material feeding device 7. The granular or bulk solid fuel 11 reacts with the oxygen containing gas at the temperature of 1300° C., to generate high temperature inflammable gas containing CO and $H_2$, wherein the high temperature inflammable gas has a temperature higher than the melting point of the dust entrained in the solid fuel, such as a high temperature inflammable gas having a temperature of 1600° C. The dust in the granular or bulk solid fuel 11 melts and flows out from the drain outlet 15. The cleaned high temperature inflammable gas enters the right side regenerator and heats the heat storage material in the right side regenerator. The high temperature inflammable gas is cooled to a temperature lower than 800° C., such as 300° C. The cooled high temperature inflammable gas flows out from the right side gas outlet 50. After a certain period of time, a reversing operation is carried out, so that the inflammable gas can discharge from the gas outlets 50 at two sides alternately.

In the furnace as described previously, the granular or bulk solid fuel 11 in the filter adhesive separator 10a acts as the fuel which can generate inflammable gas as well as the filter material in the filter adhesive separator 10a.

Embodiment 4

Figure 8:
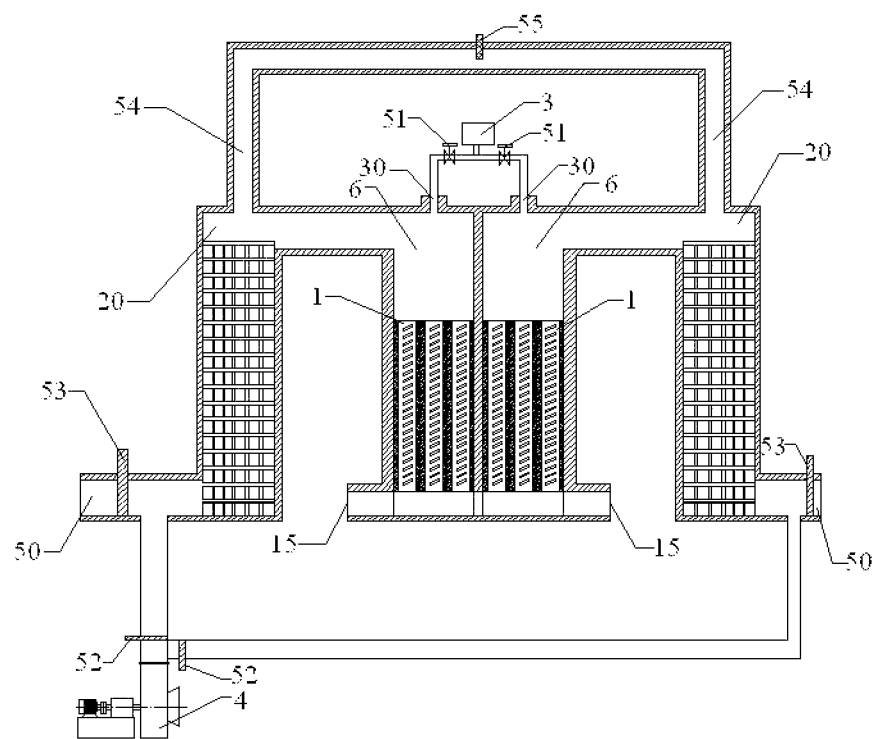

FIG. 8 illustrates a furnace which uses the method for separating out molten dust in high temperature gas according to one embodiment of the present invention. The furnace in embodiment 4 almost has the same structure as that described in embodiment 2 illustrated in FIG. 6. The difference between the furnace in embodiment 2 and the furnace in embodiment 4 lies in that, in the embodiment illustrated in FIG. 8, a delivery line 54 for delivering oxygen containing gas is arranged between two sets of generators. The gas flow rate in the delivery line 54 for delivering oxygen containing gas is controlled and adjusted by a flow control valve 55.

The furnace as illustrated in FIG. 8 can be used for making iron. The principle of iron making is detailed as following. The powder iron ore and fuel are input to the left side reaction tower 6 by a fuel or powder material feeding and controlling device 3 via the fuel inlet 30. In the left side reaction tower 6, the fuel reacts with one portion of the oxygen containing gas heated to a temperature of 500-1600° C., such as 1300° C., input to the left side regenerator of the regenerative heat exchanger 20 via the gas input device 4, to generate high temperature reductive gas having a temperature higher than the melting point of the iron ore, such as a high temperature reductive gas having a temperature of 1700° C. Powder iron ore disperses in the high temperature reductive gas having a temperature of 1700° C. and melts. Iron oxide is reduced to deposit liquid iron. Mixture of the high temperature gas and the molten iron ore, liquid iron, slag is input to the centrifugal adhesive separator 1. The molten iron ore, liquid iron and slag adhere to the side wall of the centrifugal adhesive separator 1, and are continuously scoured by the high temperature reductive gas. The iron ore adhered to the sidewall of the centrifugal adhesive separator 1 is reduced to deposit liquid iron. Finally, due to the gravity force, the liquid iron and molten slag flow out from the drain outlet 15. The liquid iron and the molten slag are separated from each other via a skimmer. Flow of the other portion of the high temperature oxygen containing gas heated in the left side regenerator is controlled by the flow control valve 55. The other portion of the oxygen containing gas is introduced to the upper portion of the right side regenerator via the delivery line 54 used for delivering oxygen containing gas, and mixed with the high temperature reductive gas cleaned by the centrifugal adhesive separator 1. Mixture of the high temperature oxygen containing gas and the high temperature reductive gas completely burns to a temperature higher than 1500° C., such as 1650° C. The high temperature gas heats the heat storage material in the right side regenerator. The cooled gas discharges via the right side gas outlet 50. After a certain period of time, a reversing operation is carried out.

Embodiment 5

Figure 9:
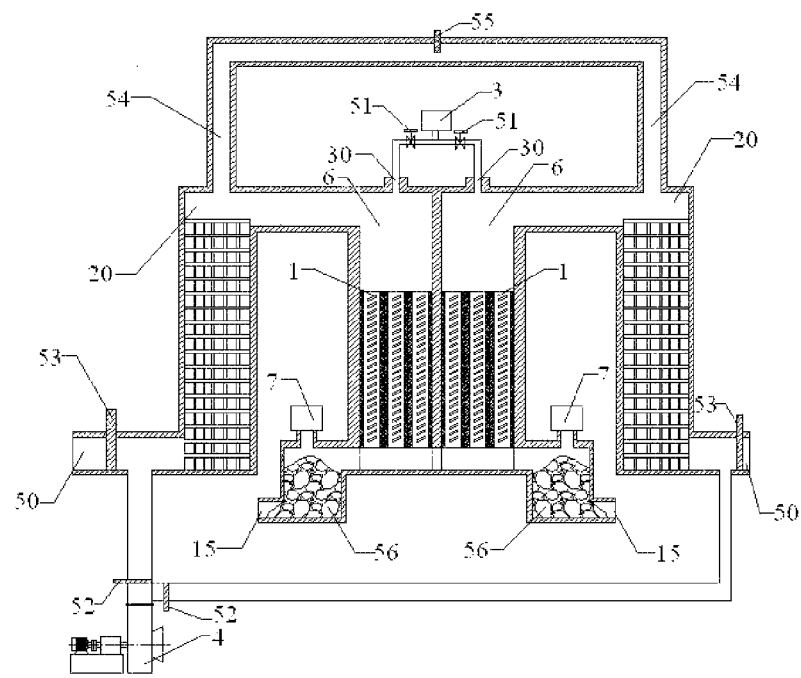

FIG. 9 illustrates a furnace which uses the method for separating out molten dust in high temperature gas according to one embodiment of the present invention. The furnace as illustrated in FIG. 9 almost has the same structure as that of the furnace in embodiment 4 (illustrated in FIG. 8). The difference between the furnace illustrated in FIG. 9 and the furnace illustrated in FIG. 8 lies in that, in FIG. 9, a layer of granular or bulk coal or hard coke 56 and a granular or bulk material feeding device 7 for adding granular or bulk coal or hard coke 56 are disposed between the chamber of the adhesive separator 1 and the drain outlet 15.

The furnace as illustrated in FIG. 9 can be used for iron making The principle of iron making is almost the same as that described in embodiment 4 (FIG. 8). The difference between the furnace of embodiment 4 and the furnace in embodiment 5 lies in that, mixture of the high temperature gas and molten iron ore, liquid iron, slag is input to the centrifugal adhesive separator 1 and is separated and reduced, and then pass through the granular or bulk coal or hard coke 56 at the downstream centrifugal adhesive separator 1. The iron ore which has not been completely reduced, if any, is further reduced by the coal or hard coke 56 to deposit liquid iron. Finally, the liquid iron and molten slag flows to the drain outlet 15 due to the gravity force and discharge from the drain outlet 15. In the process of producing iron, the granular or bulk coal or hard coke 56 is consumed constantly. A granular or bulk material feeding device 7 is needed to add granular or bulk granular or bulk coal or hard coke 56 timely.

Embodiment 6

Figure 10:
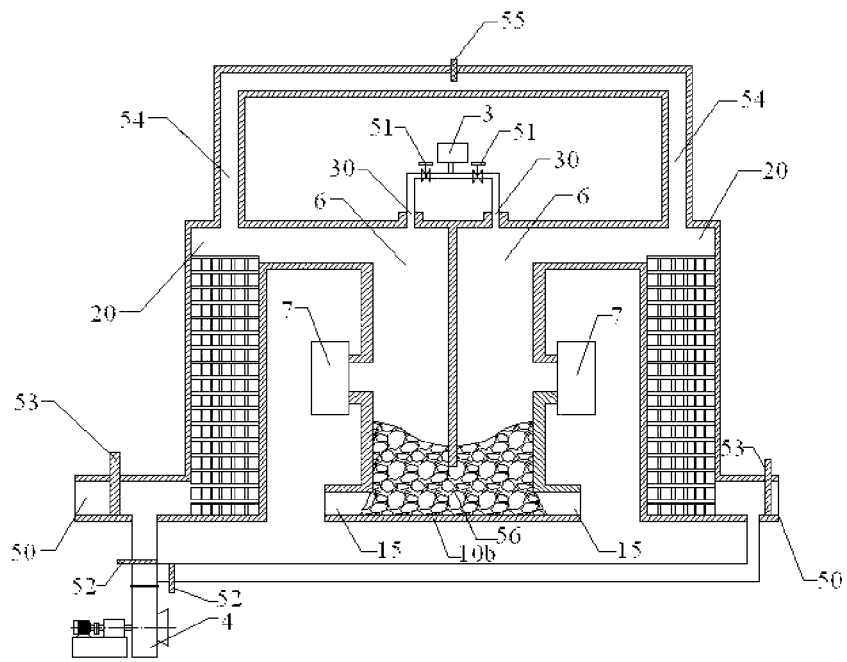

FIG. 10 illustrates a furnace which uses the method for separating out molten dust in high temperature gas. The furnace illustrated in FIG. 10 has almost the same structure as that of the furnace in embodiment 4, illustrated in FIG. 8. The furnace illustrated in FIG. 10 differs from the furnace illustrated in FIG. 8 in that, in FIG. 10, instead of a centrifugal adhesive separator 1, a filter adhesive separator 10b is used. The filter adhesive separator 10b adopts granular or bulk coal or hard coke 56 as the filter layer. Additionally, two granular or bulk material feeding devices 7 for feeding granular or bulk coal or hard coke 56 is provided.

The furnace as illustrated in FIG. 10 can be used for iron making. The principle of iron making is almost the same as that of embodiment 4 (FIG. 8). The only difference lies in that, the furnace as illustrated in FIG. 10 adopts filter adhesive separator 10b. When the mixture of high temperature gas and molten iron ore, liquid iron, slag is introduced to the filter adhesive separator 10b, the molten iron ore is constantly reduced by the filter material (e.g. granular or bulk coal or hard coke 56) which can effectively reduce the molten iron ore and deposit liquid iron. The liquid iron and the molten slag flows to the drain outlet 15 and discharge from the drain outlet 15 due to the gravity force. In the process of producing iron, the filter material is consumed constantly. Therefore, a granular or bulk material feeding device 7 is needed to add granular or bulk material timely.

Embodiment 7

Figure 11:
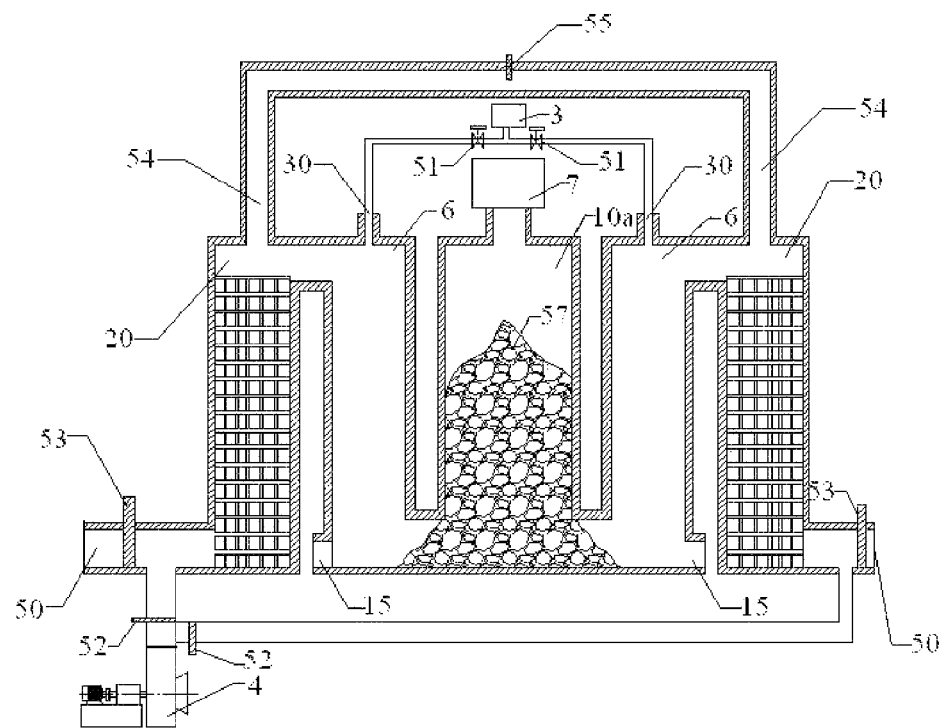

FIG. 11 illustrates a furnace which uses the method for separating out molten dust in high temperature gas according to one embodiment of the present invention. The furnace illustrated in FIG. 11 has almost the same structure as that of embodiment 4 (illustrated in FIG. 8). The furnace as illustrated in FIG. 11 differs from the furnace as illustrated in FIG. 8 in that, in the furnace illustrated in FIG. 11, instead of centrifugal adhesive separator 1, a filter adhesive separator 10a is used. The filter adhesive separator 10a adopts granular or bulk iron ore 57 as filter layer. Also, a granular or bulk material feeding device 7 for feeding granular or bulk iron ore 57 is disposed at the top of the filter adhesive separator 10a.

The furnace as illustrated in FIG. 11 can be used to making iron. The principle of iron making is detailed as following. The fuel is input to the left side reaction tower 6 from the material inlet 30 using a fuel or powder material feeding and controlling device 3. In the left side reaction tower 6, the fuel reacts with one portion of the oxygen containing gas heated to a temperature of 500-1600° C., such as 1200° C., input to the left side regenerator of the regenerative heat exchanger 20 from the gas input device 4, to generate high temperature reductive gas having a temperature higher than the melting point of the iron ore, such as a high temperature reductive gas having a temperature of 1650° C. The granular or bulk material feeding device 7 inputs the granular or bulk iron ore 57 to the adhesive separator 10a. The granular or bulk material 57 not only acts as filter material, but also acts as raw material for making iron. The high temperature reductive gas having a temperature of 1650° C. in the left side reaction tower 6 is input to adhesive separator 10a. The granular or bulk iron ore 57 is heated and melt. Iron oxide is reduced and liquid iron is deposited. Due to the gravity force, the liquid iron and the molten slag flows to the drain outlet 15 and discharge from the drain outlet 15. The liquid iron and the molten slag are separated from each other via a skimmer. The other portion of the high temperature oxygen containing gas, heated by the left side regenerator and controlled by the flow control valve 55, flows to the upper portion of the right side regenerator via the oxygen containing gas delivery line 54, and completely reacts with the high temperature reductive gas cleaned by the filter adhesive separator 10a to a temperature higher than 1500° C., such as 1650° C. The high temperature gas heats the heat storage material in the right side regenerator. The cooled gas discharges from the right side gas outlet 50. After a certain period of time, the reversing operation is carried out.

Embodiment 8

Figure 12:
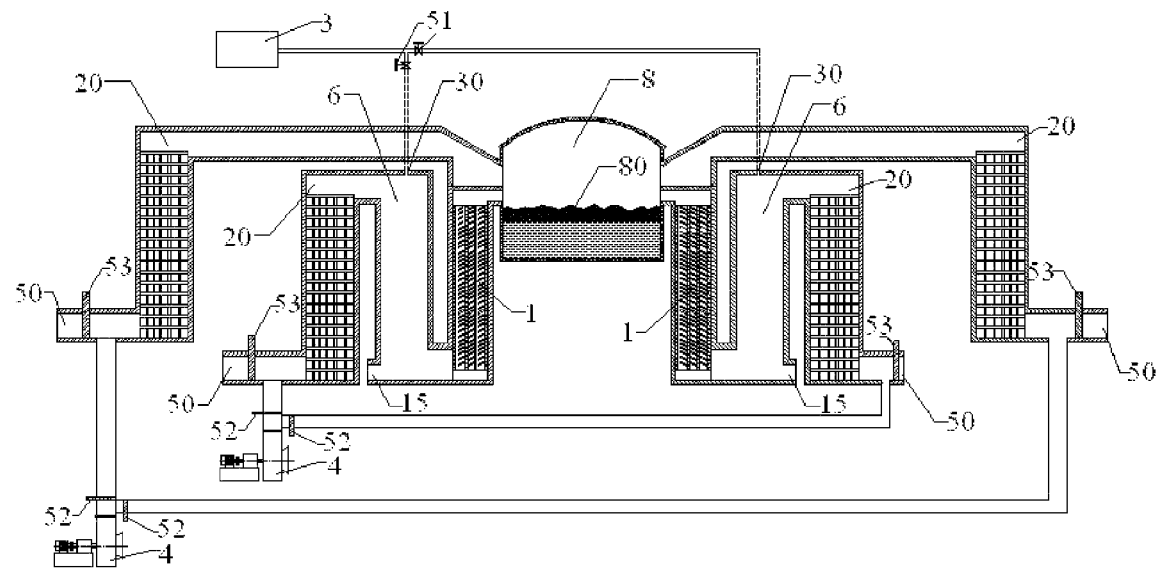

FIG. 12 illustrates a furnace which uses the method for separating out molten dust in high temperature gas according to one embodiment of the present invention. The furnace includes an industrial furnace 8, two centrifugal adhesive separators 1, two regenerative heat exchangers 20, a cyclone furnace 6, a fuel or powder material feeding and controlling device 3, two sets of gas input devices 4, two gas inverting gates 52, and twe fuel gas inverting gates 53. The two centrifugal adhesive separators 1 are seated at two sides of the industrial furnace 8 and in communication with the industrial furnace 8. Two regenerators of one regenerative heat exchanger 20 are disposed at two sides of the industrial furnace 8 and in connection with the industrial furnace 8. Two generators of the other regenerative heat exchanger 20 are connected to the two centrifugal adhesive separators 1 via a cyclone furnace 6, respectively. The fuel or powder material feeding and controlling device 3 is connected to the cyclone furnace 6 via fuel inlets 30 and valves 51. The two sets of gas input device 4 are connected to the regenerators of the two regenerative heat exchangers 20, respectively. The two sets of gas input devices 4 are connected or disconnected to corresponding regenerators via opening or closing gas inverting gates 52. The two regenerative heat exchangers 20 are connected or disconnected to the gas outlets 50 via opening or closing the fuel gas inverting gates 53.

The furnace as illustrated in FIG. 12 can be used to produce high temperature inflammable gas. The high temperature inflammable gas can be input to the industrial furnace 8 and burn, to heat the material 80 in the industrial furnace 8. The operation principle of the furnace illustrated in FIG. 12 will be detailed as following.

Oxygen containing gas is input from the two sets of regenerators at left side. The powder solid material is input to the left cyclone furnace 6 via fuel or powder material feeding and controlling device 3. The powder solid fuel is mixed with the oxygen containing gas heated to a temperature of 500-1600° C., such as 1000° C., by the set of regenerator at left side and gasify, to generate high temperature inflammable gas containing CO and $H_2$ and having a temperature higher than the melting point of the dust in the solid fuel, such as high temperature inflammable gas having a temperature of 1500° C. and molten dust. The high temperature inflammable gas and molten dust are input to the left adhesive separator 1. The molten dust discharges from the left drain outlet 15. The cleaned high temperature inflammable gas introduced to the industrial furnace 8 mixes and burns with oxygen containing gas heated by the other set of regenerators, to generate high temperature gas having a temperature of 1200-2000° C., depending on the material to be heated. The material 80 input in the industrial furnace 8 is heated, and the molten material 80 discharges from the outlet of the industrial furnace 8. The high temperature gas in the industrial furnace is then input to the two sets of regenerators at the right side, and transfers the heat to the heat storage material in the right side regenerators. The cooled gas flows out from the gas outlet 50. After a certain period of time, a reversing operation is carried out.

The industrial furnace 8 in the embodiment as previously described can be a glass melter, a metallurgical furnace or a steel rolling heating furnace.

When the industrial furnace 8 is a glass melter, the material 80 is glass batch. The temperature of the high temperature gas in the glass melter is 1500-2000° C., such as 1600° C. The glass batch is heated in the glass melter and melts into molten glass. The molten glass is output to a molding device via an outlet of the glass melter and cooled in a lehr, so as to obtain glass product.

When the industrial furnace 8 is a metallurgical furnace, taking copper smelting for example, the material 80 is copper sulfide concentrate particles. The temperature of the high temperature gas in the metallurgical furnace is 1200-1600° C., such as 1550° C. In the metallurgical furnace, the copper sulfides concentrate particles at the high temperature experiences oxidation desulfurization and melting reaction, to generate copper matte and slag as well as release a large amount of heat. The copper matte and slag are conveyed to a settling pond via the outlet of the metallurgical furnace. After clarification and separation, the copper matte and slag discharge from the matte outlet and the slag outlet, respectively.

When the industrial furnace 8 is a steel rolling heating furnace, the material 80 is steel billet. The temperature of the high temperature gas in the steel rolling heating furnace is 1300-1500° C., such as 1380° C. The steel billet is output from the rolling heating furnace after being heated to a temperature needed.

Additionally, according to other embodiment of the present invention, the furnace can only include one set of regenerative heat exchanger 20. The heated oxygen containing gas can be divided into two portions, similar to that has been illustrated in FIG. 11. One portion of the heated oxygen containing gas is communicated with the centrifugal adhesive separator 1 via a cyclone furnace, to gasify with the powder solid fuel in the cyclone furnace 6. The other portion of the heated oxygen containing gas is communicated with the industrial furnace 8, to burn with the high temperature inflammable gas cleaned and input to the industrial furnace 8.

Embodiment 9

Figure 13:
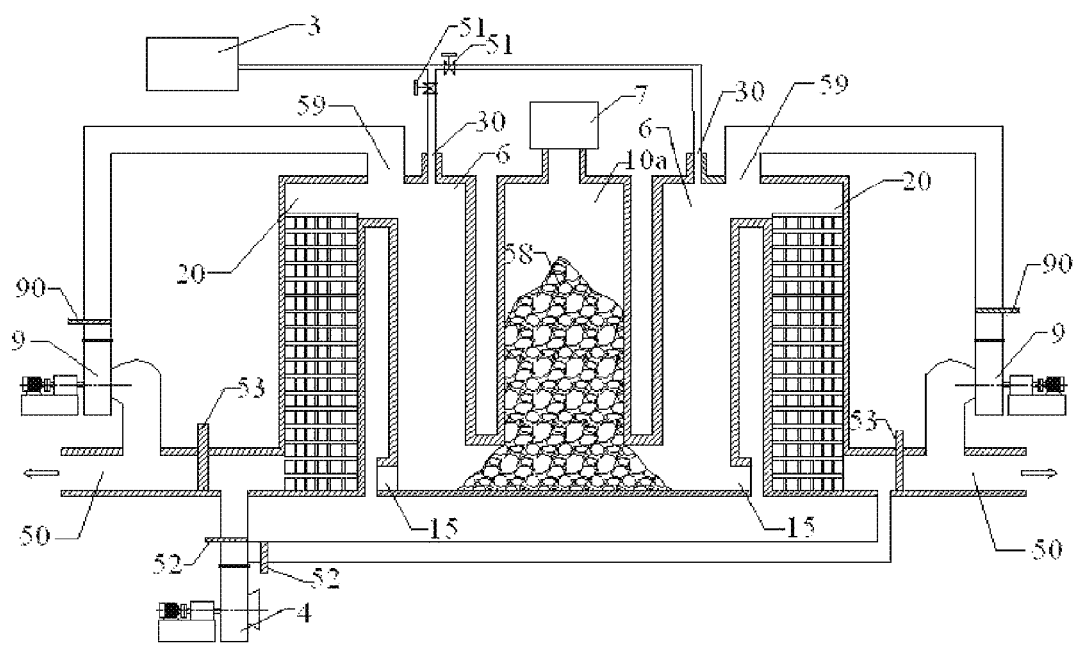

FIG. 13 illustrates a furnace which uses the method for separating out molten dust in high temperature gas according to one embodiment of the present invention. The furnace includes a filter adhesive separator 10a, two regenerative heat exchangers 20, two cyclone furnace 6, a granular or bulk material feeding device 7, a fuel or powder material feeding and controlling device 3, two valves 51, two fuel inlets 30, a gas input device 4, a gas outlet 50, two gas inverting gates 52, two fuel gas inverting gates 53, two blower devices 9, two blower inverting gates 90, and two temperature regulating air inlets 59. The filter adhesive separator 10a uses granular or bulk refractory material 58 as filter layer. Two sets of regenerators of the regenerative heat exchanger 20 are disposed at two sides of the filter adhesive separator 10a, each being in communication with the adhesive separator 10a via a cyclone furnace 6. Granular or bulk material feeding device 7 is disposed at the top of the adhesive separator 10a. The fuel or powder material feeding and controlling device 3 is connected to the cyclone furnace 6 via the valves 51 and the fuel inlets 30. Gas input device 4 is connected to the two sets of regenerators of the regenerative heat exchanger 20, respectively. The gas input device 4 can be connected or disconnected to a corresponding regenerator via opening or closing the two gas inverting gates 52. The regenerative heat exchanger 20 can also be connected or disconnected to the gas outlet 50 via opening or closing the fuel gas inverting gates 53. The temperature regulating inlet 59 is disposed at the portion where the regenerator 5 connecting the cyclone 6. Temperature regulating air inlet 59 is seated at the area where the regenerator 5 connecting with the cyclone furnace 6. The blower device 9 is disposed at the gas inlet 50, and can be connected or disconnected to the temperature regulating air inlet 59 via opening or closing the blower inverting gate 90. The blower device 9 can extract a portion of fuel gas from the gas outlet 50 and input the fuel gas to the regenerative heat exchanger 20 via the temperature regulating air inlet 59.

The furnace illustrated in FIG. 13 can be used to produce refractory material 58. Operation principle of producing refractory material 58 is detailed as following. Oxygen containing gas is introduced into the left regenerator via a gas input device 4. The oxygen containing gas is heated in the left regenerator to a temperature of 800-1600° C., such as 1550° C., before flowing into the cyclone furnace 6. In this regard, the left blower inverting gate 90 is closed. Fuel is input by a fuel or powder material feeding and controlling device 3 to the left reaction tower 6 via a material inlet 30. The fuel is mixed with high temperature oxygen containing gas. Combined consumption of fuel and oxygen containing high temperature gas can generate high temperature gas having a temperature of 1600-3000° C., such as 2200° C., which is higher than the melting point of the refractory material 58. Granular or bulk refractory material 58 is input to the adhesive separator 10a via a granular or bulk material feeding device 7. The granular or bulk refractory material 58 is molten by the high temperature gas of 2200° C. and discharge from the drain outlet 15. After casting molding and cooling, refractory material having desirable shape is obtained. Before flows into the right regenerator, the high temperature gas from the adhesive separator 10a mixes with low temperature gas from the right blower device 9 introduced via the temperature regulating air inlet 59, so that the temperature of the gas falls to a temperature which the refractory material in the regenerator can endure (e.g. lower than 1800° C.). Then, the high temperature gas is further cooled in the right regenerator and output from the right gas outlet 50. After a certain period of time, reversing operation is carried out.

The shell of the filter adhesive separator 10a is a refractory lined water-cooled metal shell or a water-cooled metal shell.

The main ingredient of the refractory material 58 includes $Al_2O_3$, $ZrO_2$, $SiO_2$, or combination thereof. For example, according to one embodiment of the present invention, the refractory material 58 is mullite refractory including 71.8 wt % $Al_2O_3$ and 26.2 wt % $SiO_2$. According to another embodiment of the present invention, the refractory material 58 is corundum refractory including 99.2 wt % $Al_2O_3$ and 0.3 wt % $SiO_2$. According to yet another embodiment of the present invention, the refractory material 58 is zirconium corundum refractory including 45.4 wt % $Al_2O_3$, 41 wt % $ZrO_2$ and 12.5 wt % $SiO_2$.

In the embodiments of the present invention which use regenerative heat exchanger as previously described, the reversing operation is carried out at an interval of 10 to 60 minutes.

While the present invention has been illustrated by the above description of the preferred embodiments thereof, while the preferred embodiments have been described in considerable detail, it is not intended to restrict or in any way limit the scope of the appended claims to such details. Additional advantages and modifications within the spirit and scope of the present invention will readily appear to those ordinary skilled in the art. Therefore, the present invention is not limited to the specific details and the illustrative examples as shown and described.

What is claimed is:

1. A method for separating out molten dust in high temperature gas, comprising the steps of:
   passing the high temperature gas carrying molten dust through an adhesive separator, so that the molten dust adhering to an inner sidewall of the adhesive separator and being separated from the high temperature gas, the molten dust adhering to the inner sidewall flowing down along the inner sidewall and discharging via a drain outlet in a bottom portion of the adhesive separator due to the gravity force;
   conveying the cleaned high temperature gas to a heat exchanger directly or right after further reacting with/ heating materials for cooling and discharging;
   using heat recycled by the heat exchanger to heat gas supplied to the adhesive separator; and
   supplying the gas heated by the heat exchanger into the adhesive separator directly or after further reaction, heat absorbed from the heat exchanger alone or together with heat generated in the further reaction keeping temperature of the gas flowing out of the adhesive separator higher than the melting point of the dust.

2. The method for separating out molten dust in high temperature gas of claim 1, wherein the heat exchanger is a regenerative heat exchanger and the temperature of the cleaned high temperature gas flowing out of the adhesive separator is kept higher than the melting point of the dust via controlling a reversing operation time of the regenerative heat exchanger.

3. The method for separating out molten dust in high temperature gas of claim 1, wherein the ratio of inner sidewall area of the adhesive separator to the flow of the high temperature gas to be processed is more than $1(m^2)/10000(m^3/h)$, so that the separation efficiency of the molten dust in the high temperature gas is more than 95%; or the ratio of inner sidewall area of the adhesive separator to the flow of the high temperature gas is more than $1(m^2)/1000(m^3/h)$, so that the separation efficiency of the molten dust in the high temperature gas is more than 99%.

4. The method for separating out molten dust in high temperature gas of claim 1, wherein the adhesive separator is a centrifugal adhesive separator, or a filter adhesive separator, or combination thereof; when the centrifugal adhesive separator is used, the high temperature gas carrying molten dust rotates in a chamber of the centrifugal adhesive separator, so that the molten dust in the high temperature gas is thrown out of the high temperature gas and adheres to the inner sidewall of the adhesive separator due to the centrifugal force; when a filter adhesive separator is used, the high temperature gas carrying molten dust passes through the space between filter layers stacked by filter material, so that the molten dust adheres to the filter material and is separated from the high temperature gas.

5. An adhesive separator for use in the method of claim 1, wherein the adhesive separator is a centrifugal adhesive separator comprising a housing, a chamber, at least one gas inlet, at least one gas outlet and at least one drain outlet, the chamber is enclosed by inner sidewall of the adhesive separator and generally has a cylindrical profile; the gas inlet and the gas outlet are disposed at two ends of the housing and each in communication with the chamber; the drain outlet is disposed at a lower side of the housing and is in communication with the bottom portion of the chamber, and the inner sidewall of the adhesive separator is formed with a number of air rotating guide bars each being obliquely tangent to the axis of the chamber.

6. The adhesive separator of claim 5, wherein the air rotating guide bar is a projecting bar or a spring shape spiral guide bar integrally formed with the inner sidewall of the adhesive separator, or a spring shape spiral guide bar set in the chamber of the adhesive separator after being formed separately.

7. The adhesive separator of claim 5, wherein the adhesive separator comprises more than one chamber, the gas inlet and the gas outlet are seated at different sides of the housing, and the more than one chamber are connected in parallel and share a gas inlet, a gas outlet and a drain outlet.

8. The adhesive separator of claim 7, wherein the more than one chamber of the centrifugal adhesive separator are stacked by a plurality of cylindrical refractory bricks, the cylindrical refractory brick has a square or rectangular cross section, and the air rotating guide bar is formed on an inner sidewall of the cylindrical refractory brick or directly arranged in the chamber of the cylindrical refractory.

9. An adhesive separator for use in the method of claim 1, wherein the adhesive separator is a filter adhesive separator comprising a housing, a gas inlet, a filter layer, a gas outlet and a drain outlet, the filter layers are stacked by filter material with space disposed therebetween, the filter material comprises metal material, refractory material, raw mineral material, solid fuel or combination thereof.

10. The adhesive separator of claim 9, wherein the filter layers have a grid structure formed by multiple layers, rows and columns stacked by a plurality of rectangular refractory bricks, and space between the refractory bricks defines a number of grid structure chambers.

* * * * *